US012562671B2

(12) United States Patent
    Tyler et al.

(10) Patent No.:     US 12,562,671 B2
(45) Date of Patent:     Feb. 24, 2026

(54) PERIMETER BLOCK DEVICE AND METHODS

(71) Applicant: Erthos IP LLC, Tempe, AZ (US)

(72) Inventors: James Scott Tyler, Tempe, AZ (US); Benjamin Keith Symmers, Tempe, AZ (US); Andy Nyce, Tempe, AZ (US); Chad Medcroft, Tempe, AZ (US)

( * ) Notice: Subject to any disclaimer, the term of this patent is extended or adjusted under 35 U.S.C. 154(b) by 96 days.

(21) Appl. No.: 18/674,171

(22) Filed: May 24, 2024

(65) Prior Publication Data

US 2025/0364940 A1      Nov. 27, 2025

Related U.S. Application Data

(63) Continuation-in-part of application No. 17/935,909, filed on Sep. 27, 2022, now Pat. No. 12,074,560, which is a continuation-in-part of application No. 17/746,782, filed on May 17, 2022, now abandoned, which is a continuation-in-part of application No. 16/682,517, filed on Nov. 13, 2019, now abandoned, said application No. 17/935,909 is a continuation-in-part of application No. 17/153,845, filed on Jan. 20, 2021, now Pat. No. 11,456,695.

(60) Provisional application No. 62/903,369, filed on Sep. 20, 2019, provisional application No. 63/021,928, filed on May 8, 2020, provisional application No.

63/052,367, filed on Jul. 15, 2020, provisional application No. 62/963,300, filed on Jan. 20, 2020.

(51) Int. Cl.
    *H02S 20/10*      (2014.01)
    *H02S 30/10*      (2014.01)

(52) U.S. Cl.
    CPC .............. *H02S 20/10* (2014.12); *H02S 30/10* (2014.12)

(58) Field of Classification Search
    CPC ................................ H02S 20/10; H02S 30/10
    See application file for complete search history.

(56) References Cited

U.S. PATENT DOCUMENTS

2016/0336895 A1*  11/2016  Wildes .................... H02S 20/10
2021/0091715 A1*   3/2021  Miller ................... F24S 25/617

* cited by examiner

*Primary Examiner* — Jayne L Mershon
(74) *Attorney, Agent, or Firm* — Thomas W. Galvani, P.C.; Thomas W. Galvani

(57)      ABSTRACT

Perimeter blocks for a PV array comprising fastener or component holes for anchoring the array bonding the array and protecting array cabling. Perimeter blocks provide a favorable aerodynamic shape to help deflect incoming wind, to channel rainwater over the array, and to protect the edge of the array. PV arrays having PV modules and perimeter blocks contacting native topography or a smoothed or substantially flat portion of the ground in an array and holding the array together and down are also disclosed.

20 Claims, 23 Drawing Sheets

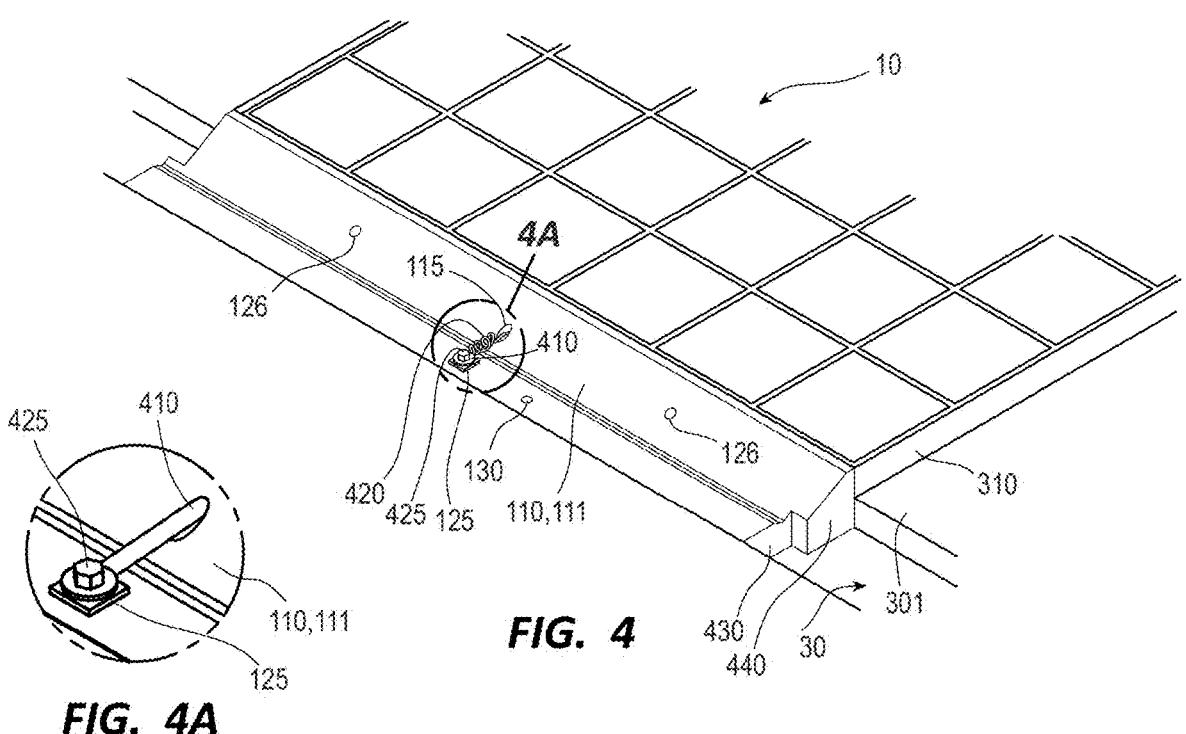
FIG. 4A
FIG. 4
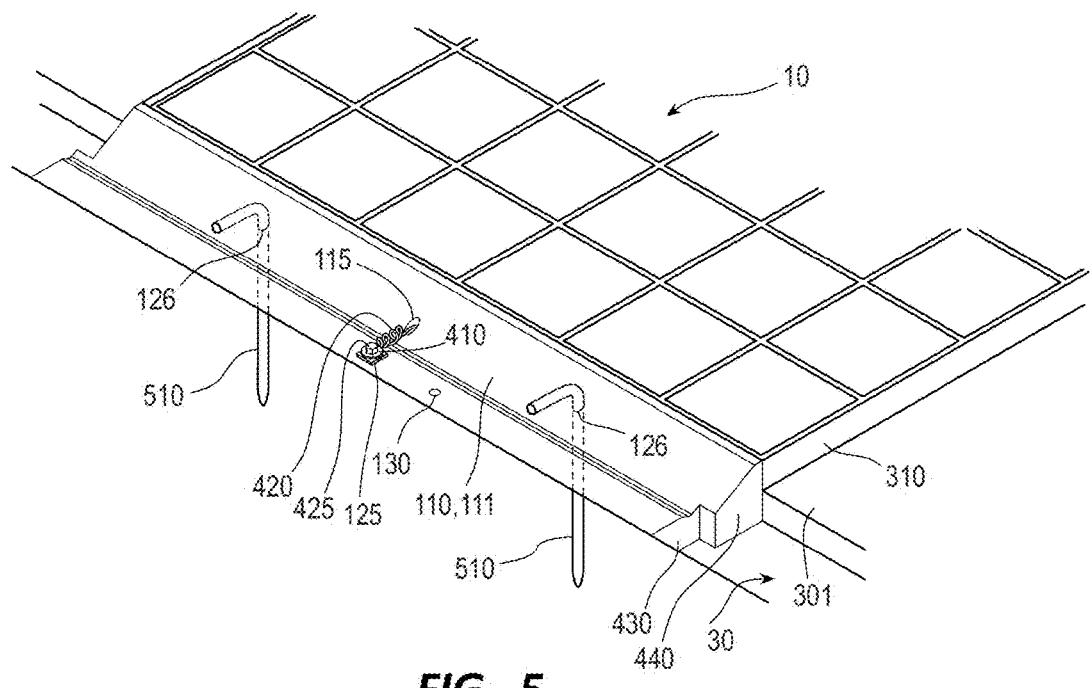
FIG. 5

1310

115, 126

115, 126

1910

1925

1940

1930

1950

2310

2321

2350

2325

PERIMETER BLOCK DEVICE AND METHODS

CROSS-REFERENCE TO RELATED APPLICATIONS

This application is related to and claims priority to US Provisional Patent Application Numbers and Non-Provisional Application numbers set out below, which are incorporated by reference:

62/963,300, filed on Jan. 20, 2020.
63/021,928, filed on May 8, 2020.
63/052,367, filed on Jul. 15, 2020.
Ser. No. 17/153,845, filed on Jan. 20, 2021, issued.
Ser. No. 17/746,782, filed on May 17, 2022, pending.
Ser. No. 17/935,909, filed on Sep. 27, 2022, allowed.

BACKGROUND

Fixed tilt (FT) and Single axis tracker (SAT) Photovoltaic (PV) systems are commonly designed and implemented today as a renewable energy generation means for Utility-Scale Energy production providing both Transmission and Distribution level power to the US and Global Electrical Grids. Utility-scale FT and SAT systems PV systems use equipment from many producers of FT and SAT structural racking systems, which systems are made from steel. Engineering firms design solar sites and arrays to site-specific geographical locations, solar insolation, and weather, and the authority having jurisdiction requirements to maximize module and string efficiency performance by orienting the modules to the sun at specified azimuth-dependent FT angles and SAT orientations. FT and SAT systems are azimuth-dependent as the modules are tilted toward the sun to maximize the full-day potential from sunup to sundown. Due to the high cost of the modules, solar module efficiency and performance are the primary drivers in the plant's design, which optimizes the plant's individual and combined performance to meet the maximum efficiency of the solar panels.

Some types of modules contain a laminate in frames. Other types contain a laminate only. And many other variations exist. Module frames are typically constructed of aluminum, which provides the main mechanical fastening surface and structural support securing the module frame to the rigid structural racking of FT and SAT systems. The module construction, module dimensions, modules per structural row, racking structure specifications, tilt angle, row azimuth, length of each rigid row, and a maximum height above grade at full tilt-and-stow of modules are all considered during racking system design. Rigid racking designers must account for wind and snow load, seismic predictions, soil geology, and bearing to design these types of racking. Many factors, including the structural wind loading requirements, structural steel design, and pile embedment parameters, determine how well FT and SAT systems resist the wind. Additionally, structural racking system designers must account for soil corrosion. The DC-impressed current that comes with FT and SAT systems accelerates steel corrosion. And corrosive soils exacerbate normal steel corrosion. Solar sites typically have a design life of more than 25 years, meaning that corrosion resistance and mitigation measures must last at least that long. They are critical to the solar plant's long-term life. Corrosion mitigation includes increased thickness of pile galvanization, sacrificial post steel, epoxy coatings, and cathodic protection for the structure.

Wind is also a problem for FT and SAT systems. ASCE site-specific wind 3-second gust criteria are used in the US to determine the maximum wind loading for each structural racking system per geographic location. FT and SAT systems rows can typically exceed 10 ft above grade in elevation at maximum tilt, and rigid single rows approach 300 feet long with multiple structural piles per row. A typical 1500 V tracking system row will have 3 strings of 28 modules, 84 modules per row, and a maximum tilt of 55 degrees. The three-second gust wind speed criteria vary between 85 to 130 mph+ upon location. Based on the maximum wind speed at a given location, huge loads exist on both FT and SAT systems PV systems due to their heights above grade, tilt angles of the modules, and large exposed surface areas of both the front and back sides of the modules themselves. They act like sails. These wind loads cause high-frequency vibrational loading on the modules and commonly cause in-module microcracking as the plant ages. Module microcracking can prematurely degrade module efficiency and destroy the module.

Each structural racking system and site design must provide a minimum row-to-row spacing to avoid the modules shading each other. The shading of adjacent rows due to the sun's orientation and the structural system's tilt angle throughout the day is minimized by spacing arrays away from each other, thereby maximizing energy production. Row-to-row spacing typically means that a Ground Coverage Ratio (GCR) for a solar site utilizing FT or SAT technology is around GCR=35%, with row spacing typically varying between 15 to 21 ft center on center pile per row. Designs can increase the number of rows per array by shrinking the row spacing on a given land plot. But shading increases when row spacing decreases. Daily energy production of the individual rows falls as they begin to shade each other. And while increasing the row-to-row spacing will decrease shading, it uses more land, and cabling per energy unit.

FT and SAT racking systems' conventional goals have been to orient the module to the sun, resist mechanical loading generated by wind, snow, and frost heave, and prevent structural failure because of soil corrosion. Optimizing to the sun's incidence angle to maximize module efficiency has been the design standard because the modules have been the most expensive part of the plant by many orders of magnitude. By orienting the module to the sun, despite the added cost of a structural racking system as a balance of system cost, the lowest cost of electricity (LCOE) for Utility Solar PV has historically been achieved.

SUMMARY

Utility-scale PV arrays comprising several PV modules on or contacting native topography or a smoothed or substantially flat portion of the ground in an array and a perimeter block adapted to direct wind across the array or preventing or impeding water flow underneath the block are disclosed. In some versions, the perimeter edge block comprises more than one perimeter block or more than one. Module alignment cables or connecting cables pass through the module alignment holes.

In some versions, perimeter blocks have upper sides, horizontal portions, angled portions, module alignment holes, and bonding holes. In some versions, perimeter blocks have thick flanges, front edges, vertical walls, inclined surfaces, and back edges.

Some versions of perimeter blocks have a capped perimeter block base with a longitudinal slot and a cap with a tongue in these or other versions. In some versions, the tongue is disposed in the slot.

In these or other versions, perimeter blocks also have one or more clips extending vertically from the back edge of the panel receiving surface. In these or other versions, perimeter blocks further have a standoff extending horizontally back and down from the bottom edge of the vertical wall and forming a panel receiving surface on top of the standoff. In these or other versions, the array is smoothed.

BRIEF DESCRIPTION OF FIGURES

The figures accompanying the written portion of this specification illustrate variations and methods of use for the present devices.

FIG. 4 is another perspective view of the device of FIG. 1A.

FIG. 4A is an expanded view of the device of FIG. 4.

FIG. 5 is another perspective view of the device of FIG. 1A.

DETAILED DESCRIPTION

Figures 1A, 1B:
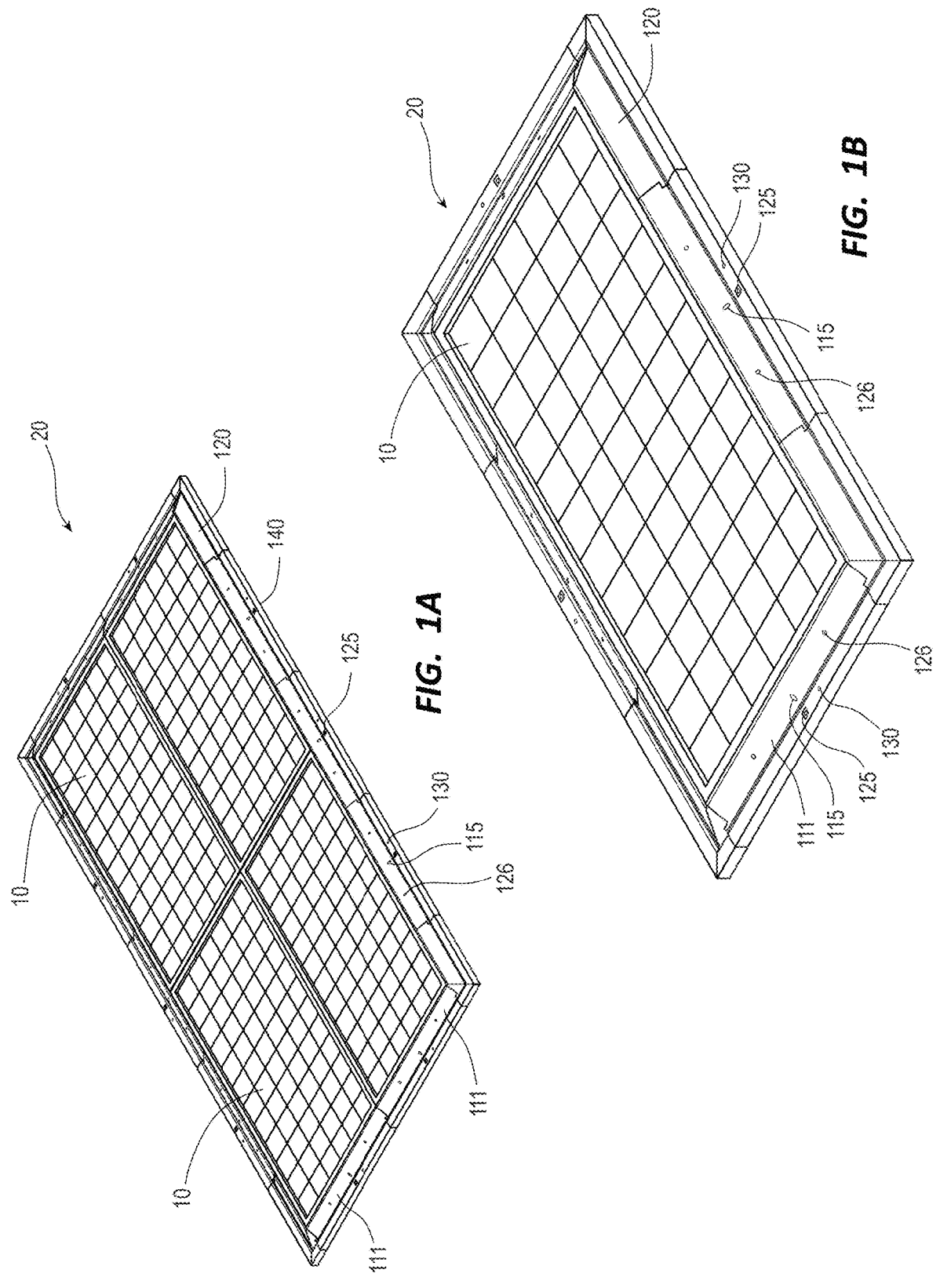
FIG. 1A is a perspective view of a version of the disclosed devices.
FIG. 1B is another perspective view of a version of the disclosed devices.
Figure 1C:
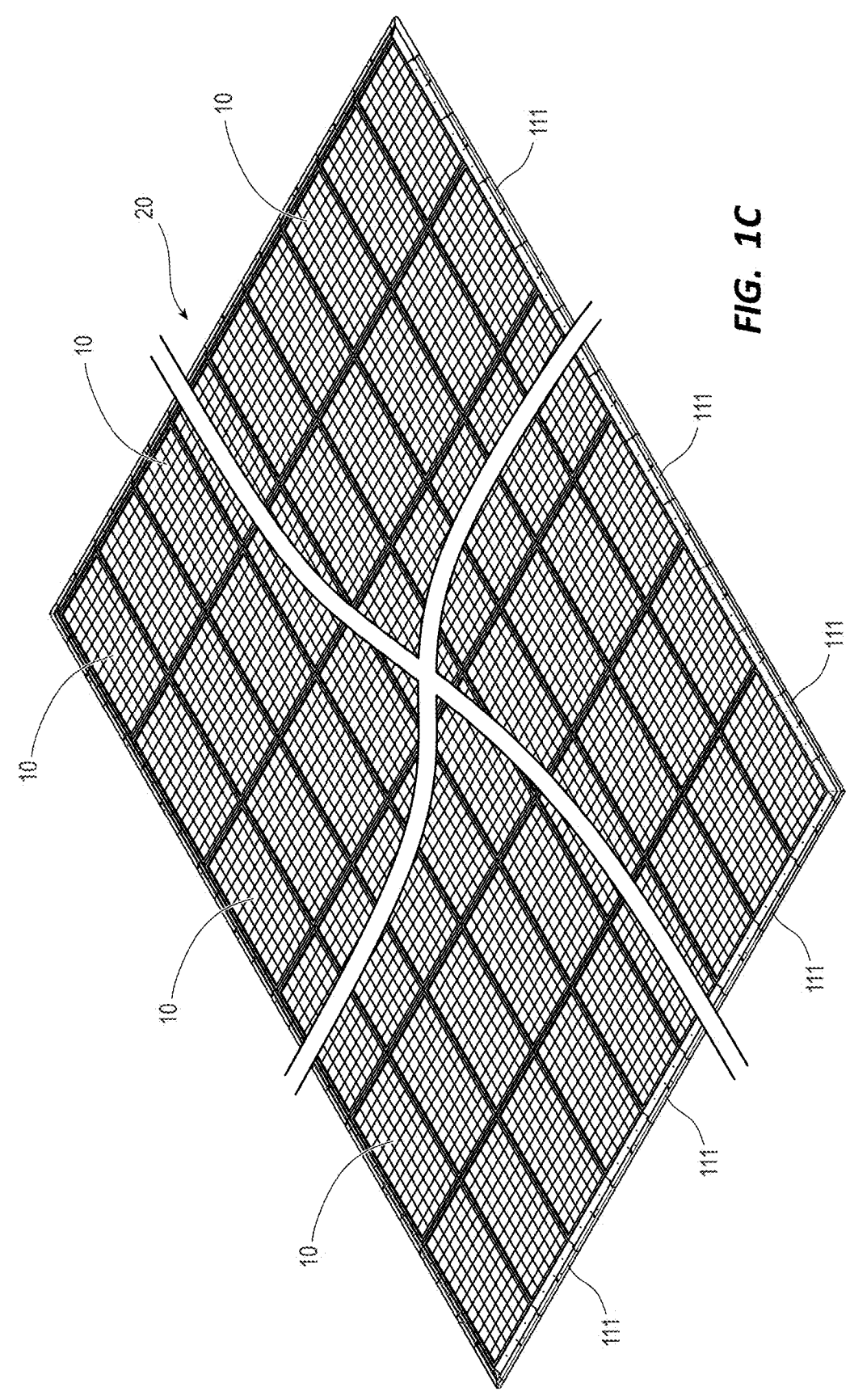
FIG. 1C is yet another perspective view of a version of the disclosed devices.

As module prices have fallen over the last decade and module efficiencies have improved, a tipping point occurred where the LCOE model changed. Once module prices dropped below this tipping point, the comparative cost of the structural racking system became cost-prohibitive; as module costs dropped, the racking costs were no longer justifiable. Therefore, eliminating the structural racking system, the system's capital cost, row spacing requirements, installation costs, and associated components yield a lower LCOE for flat-on-ground (FOG) systems than Ground Mount systems.

Earth Mount Technology simplifies the solar array, its number of components, its capital equipment, and labor costs by eliminating the structural racking system between the module and the Earth. Earth Mount Solar (compared to FT and SAT systems described above) places the module directly in contact with the Earth without an intermediate structure between the module and the Earth. The Earth then becomes the primary structural supporting means, and the module and strings of modules are now oriented directly to the Earth. There is some efficiency loss of the modules (by not optimizing the tilt angle or tracking the modules, as has historically been performed). Still, the capital equipment and associated labor cost reductions far outweigh the loss of module efficiency, resulting in a much lower LCOE than conventional ground mount technologies. Earth Mount technology has no steel posts, no steel racking, no cable management along the structure, no row shading from row to row, decreased land use per MWac, no structural wind loading due to proximity to grade and aerodynamic design, azimuth independent array layouts, no underground structural pile penetrations, no steel corrosion, no frost heave, no underground pile risk, no cost of installation of the mechanical structure to support the modules, reduced DC cable length, and many other advantages.

While the individual modules of an Earth Mount system do not produce as much energy as their competitive FT and SAT systems, the reduction in the cost of the structural components and associated labor, reduction of land, etc., allows for more modules to be employed, thereby producing the same energy as an FT or SAT PV plant. By increasing the number of total modules installed onsite (and increasing the DC:AC ratio compared to FT/SAT), the Earth Mount technology can produce the same energy profile while reducing the LCOE compared to a similar conventional Ground Mount Technology.

Earth Mount Technology can produce the same energy as an FT or SAT profile with less than half the land consumption per MWac of the solar PV plant, over 50% greater speed of construction installation, reduced wind loading, snow loading, and mechanical module stress from wind, and far lower LCOE as compared to typical FT and SAT systems. By placing the modules directly on the Earth, the wind loading is reduced, the microcracking potential is significantly reduced, steel corrosion is eliminated, and the plant's life expectancy is significantly increased.

The disclosed technology provides a component for generating electricity using commercially available, utility-scale solar photovoltaic (PV) modules 10, new and novel adaptations of these, or new module technologies. These components form a perimeter around an Earth-mounted PV module array(s) or FOG system. Earth-mounted means mounted on or contacting native topography or a smoothed or substantially flat portion of the ground without an intermediate structure between the module and the Earth. This mounting establishes an Earth orientation of the solar PV modules 10 because the ground or terrain orients the modules rather than the module being oriented to accommodate the angle of impinging solar rays. The disclosed components are called perimeter blocks 110, 111. This name fits because the units present a favorable aerodynamic profile to winds that move over the solar plant, specifically over module arrays and blocks. Earth Mount technology defines an island as an array or arrays continuously surrounded by a perimeter of perimeter blocks. In some versions, the islands form a primary subdivision for all the modules 10 deployed in the plant. In some versions, perimeter blocks also direct water generally over the array in sheet flow, preventing water flow from undercutting the modules and arrays and minimizing soil erosion.

Modules 10, like floor tiles, are placed in an edge-to-edge and end-to-end grid pattern. The plant's utility-scale nature typically dictates using this system at 600 volts DC or above. But in principle, this technology is also suited for lower voltage systems. Perimeter blocks 110,111 facilitate ground placement of solar modules 10. These perimeter blocks 110, 111 do not limit the modules' attachment methods to one another or the Earth. This module 10 arrangement with a perimeter of perimeter blocks 110, 111 substantially increases the downward pressure forces experienced by the island or array as the wind blows across them. Therefore, perimeter blocks 110, 111 improve the stability and security of the islands or arrays. And the module 10 arrangement facilitated by perimeter blocks 110, 111 allows for more economical surface dust removal from or cleaning of the modules' surface.

In some versions, perimeter blocks 110,111 are concrete (or similar material) and can be poured and shaped in place or pre-cast into individual units. Sometimes, perimeter blocks 110,111 eliminate any need for rigid structural support systems or ground penetrations inside the array border.

Perimeter blocks 110,111 dictate module 10 locations within edge unit assembly. Sometimes, this facilitates aligning modules 10 from one to another. Perimeter blocks 110, 111 can also be buried or partially buried within the Earth by creating a ditch and placing or pouring the units inside the ditch. This arrangement curtails the lateral movement of perimeter blocks. Partial burying combats erosion underneath perimeter blocks 110, 111, and into the array's interior. And in some versions, culvert portions in some units allow rainwater to flow along the lengths of perimeter blocks 110, 111. These units deflect the wind over Earth-mounted modules 10, which blocks horizontal wind loads on module frames and prevents wind from lifting modules 10 by flowing between modules 10 and the Earth.

In some versions, perimeter blocks 110, 111 anchor the array down and serve as a ballast to the array, sometimes through the units' weight and sometimes through the units' design. For versions that warrant having them, perimeter blocks 110, 111 have threaded bolt inserts or other connections to terminate the flexible connections that span the array mechanically. In addition, optional anchor holes can receive anchor rods for environments like those with high seismic activity. This arrangement better secures perimeter blocks 110, 111, and the array in place. And the units provide a mechanical barrier to the edges of the surrounded modules 10, which makes damage less likely.

Component Numbers

10 PV module
20 PV module group
30 ditch
40 DC wiring
110 long perimeter block
111 short perimeter block
115 module alignment hole
120 perimeter block corner unit
125 threaded insert
126 anchor hole
130 bonding hole
301 grade
310 module frame
311 semiconductor layer
320 upper side (US)
321 horizontal portion
325 angled portion
327 culvert portion
410 alignment cable
420 cable swage
425 cable anchor
430 scarf joint notch
440 perimeter block end
510 anchor or perimeter block anchor
610 wind vectors
620 downforce vectors
700 perimeter blocks
710 anchor hole
720 capped perimeter block base
725 cap
726 tongue
727 top
730 thick flange
731 thin flange
733 front edge
740 tall flange wall
741 tall flange incline surface
745 short flange wall
746 short flange incline surface
750 back edge
760 cavity
810 vertical groove
820 slot
1010 no standoff (NS) perimeter block
1011 NS wall
1012 NS upper side
1014 angled portion
1020 NS spring clip
1022 NS module alignment slot
1030 NS rear edge
1031 NS bonding slot
1035 NS anchor hole
1040 NS thick flange
1041 NS thin flange
1042 NS angled portion
1050 NS screw anchor
1055 NS cavity
1060 glass

1110 standoff (SO) perimeter block
1120 SO spring clamp
1122 SO module alignment slot
1126 SO bonding slot
1140 SO thick flange
1142 SO angled portion
1143 SO wall
1150 standoff
1210 gravel
1220 foundation
1230 post
1240 alignment cable
1310 curved corner edge
1410 perimeter block
1420 ledge
1425 angled portion
1510 perimeter block
1520 ledge
1521 horizontal portion
1525 angled portion
1530 lip
1575 alignment flag
1580 alignment block
1910 perimeter block
1925 angled portion
1930 relief
1940 top edge
1950 grooves
2010 perimeter block
2025 angled portion
2030 relief
2040 top edge
2120 ledge
2130 relief
2140 top edge
2210 perimeter block
2225 angled portion
2230 relief
2240 top edge
2250 leg
2420 ledge
2421 horizontal portion
2425 angled portion Unless defined otherwise, all technical and scientific terms used in this document have the same meanings as commonly understood by one skilled in the art to which the disclosed invention pertains. Singular forms—a, an, and the—include plural referents unless the context indicates otherwise. Thus, reference to "fluid" refers to one or more fluids, such as two or more fluids, three or more fluids, etc. When an aspect is to include a list of components, the list is representative. If the component choice is limited explicitly to the list, the disclosure will say so. Listing components acknowledges that implementations exist for each component and any combination of the components-including combinations that specifically exclude any one or any combination of the listed components. For example, "component A is chosen from A, B, or C" discloses implementations with A, B, C, AB, AC, BC, and ABC. It also discloses (AB but not C), (AC but not B), and (BC but not A) as implementations, for example. Combinations that one of ordinary skill in the art knows to be incompatible with each other or with the components' function in the invention are excluded in some implementations.

When an element or layer is called being "on", "engaged to", "connected to" or "coupled to" another element or layer, it may be directly on, engaged, connected, or coupled to the other element or layer, or intervening elements, or layers may be present. When an element is called being "directly on", "directly engaged to", "directly connected to", or "directly coupled to" another element or layer, there may be no intervening elements or layers present. Other words used to describe the relationship between elements should be interpreted in a like fashion (e.g., "between" versus "directly between", "adjacent" versus "directly adjacent", etc.).

Although the terms first, second, third, etc., may describe various elements, components, regions, layers, or sections, these elements, components, regions, layers, or sections should not be limited by these terms. These terms may distinguish only one element, component, region, layer, or section from another region, layer, or section. In addition, terms such as "first", "second", and other numerical terms do not imply a sequence or order unless indicated by the context. Thus, a first element, component, region, layer, or section discussed below could be termed a second element, component, region, layer, or section without departing from this disclosure.

Spatially relative terms, such as "inner", "outer", "beneath", "below", "lower", "above", and "upper," may be used for ease of description to describe one element or feature's relationship to another element or feature as illustrated in the figures. Spatially relative terms may be intended to encompass different orientations of the device in use or operation besides those depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations), and the spatially relative descriptors interpreted.

The description of the implementations has been provided for illustration and description. It is not intended to be exhaustive or to limit the invention. Individual elements or features of a particular implementation are not limited to that implementation but, where applicable, are interchangeable and can be used in a selected implementation, even if not explicitly shown or described. The same may also be varied. Such variations are not a departure from the invention, and all such modifications are included within the invention's scope.

Components

Unless otherwise indicated or dictated by the specific discussion, the features of the versions are interchangeable between versions.

FIG. 1A shows a representative PV module group 20 with four PV modules 10. The perimeter of the PV module group 20 has long perimeter blocks 110, perimeter block corner units 120, and short perimeter blocks 111. Long perimeter block 110 and short perimeter block 111 have module alignment holes 115 disposed horizontally through the unit, threaded insert 125, anchor holes 126, and bonding holes 130. FIG. 1B shows a representative utility-scale PV module group 20'. Perimeter blocks 110, 111 have a shape that impedes water flow under the body of a perimeter block. One way of doing this is to have a shape that causes flowing water to flow up the body more easily onto the module surfaces than under the body.

Figures 2A, 2B:
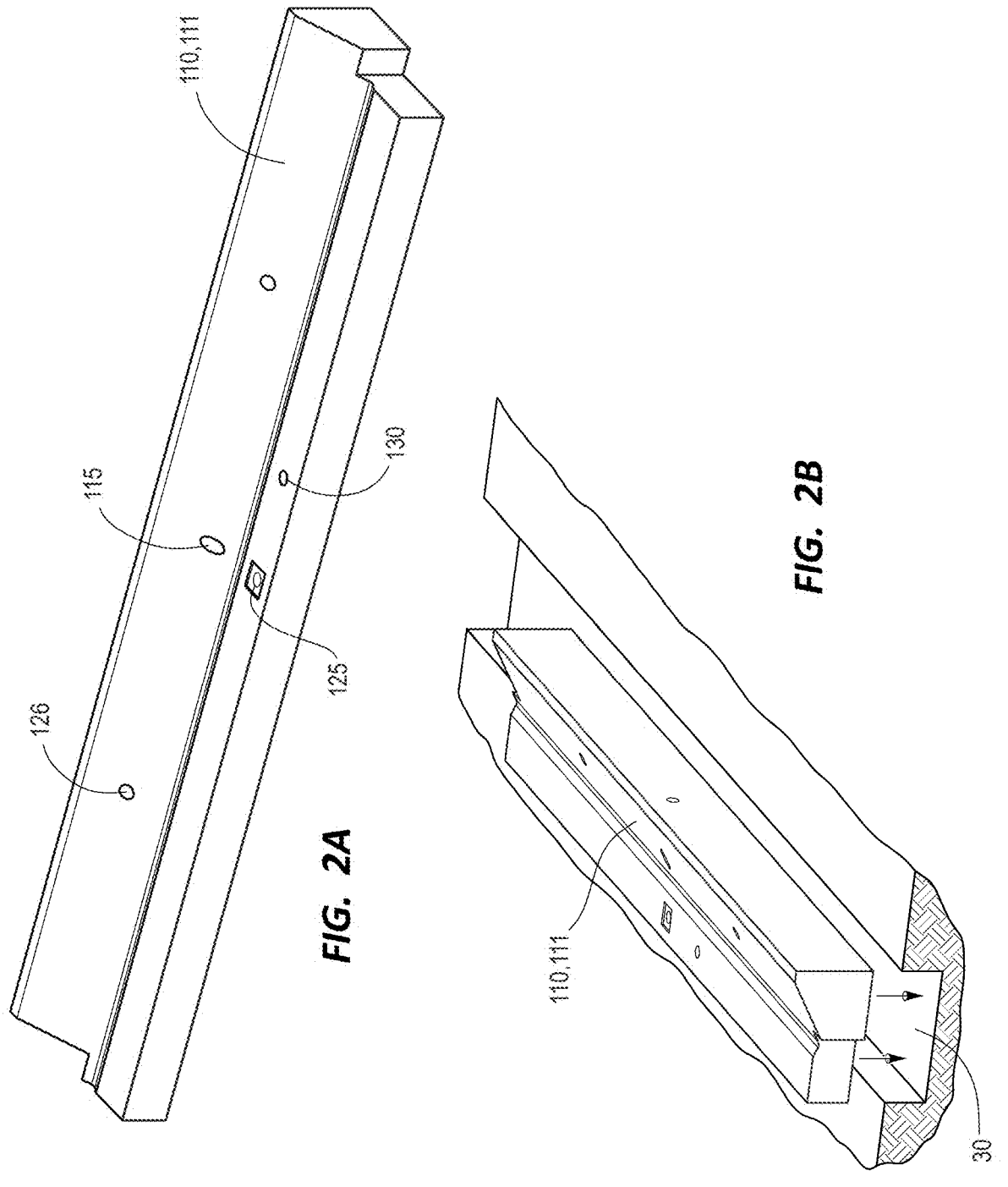
FIG. 2A is a close-up perspective view of the device of FIG. 1A.
FIG. 2B is another perspective view of the device of FIG. 1A.

FIG. 2A shows a close-up view of a long perimeter block 110 (although short perimeter block 111 is similar). Besides module alignment hole 115, bonding hole 130 is disposed horizontally through perimeter blocks 110, 111, and threaded insert 125 is disposed vertically through perimeter blocks 110, 111. Bonding hole 130 is situated such that the cables for the electrical bonding system of the PV module group 20 extend from module 10 to be connected or bonded to ground. Thus, all the electrically conductive components inside the array, such as PV module frames 310, can be electrically bonded to ground, as desired. In some versions, module alignment or connecting cables extend through module 10. The threaded insert 125 allows these cables to connect to perimeter blocks 110, 111 after passing through module alignment hole 115. Anchor holes 126 are optional and are useful when the site calls for increased horizontal constraints on PV module 10 than the group into PV module group 20 provides. For instance, anchor holes 126 may be used in sites where higher seismic activity could occur.

FIG. 2B shows a perimeter block 110, 111 placed into ditch 30 in this version. This placement adds additional resistance to horizontal displacement-ditch 30 holds perimeter blocks 110, 111 in place more so than top-of-the-ground placement.

Figures 3A, 3B:
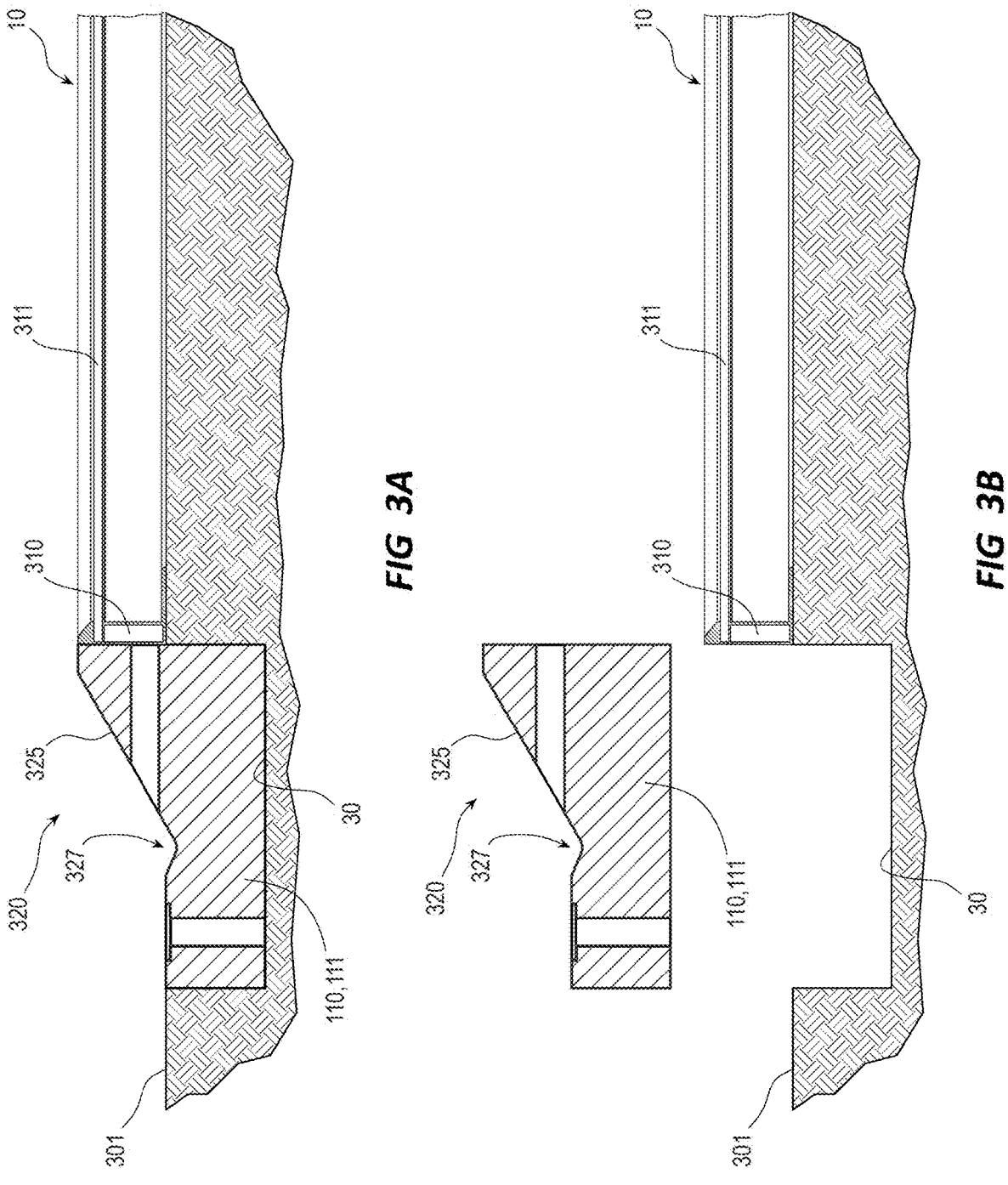
FIG. 3A is a cross-section view of the device of FIG. 1A.
FIG. 3B is another cross-section view of the device of FIG. 1A.

FIG. 3A shows a cross-sectional view of perimeter blocks 110, 111. The upper side (US) 320 of perimeter blocks 110, 111 has a horizontal portion 321, an angled portion 325, and a culvert portion 327. This figure also shows PV module group 20, which comprises PV module 10. PV modules 10 have PV module frame 310 and semiconductor layer 311. The figure also shows the surface of the Earth, grade 301. In this version, the horizontal portion 321 is substantially even with grade 301. For this disclosure, "substantially even with grade" means within plus or minus 25 mm or plus or minus 17 mm of coplanarity between horizontal portion 321 and grade 301.

FIG. 3B shows an exploded, cross-sectional view of perimeter blocks 110, 111. As the figure shows, perimeter blocks 110, 111 sit in ditch 30. (While module 10 is shown in place for illustrative purposes, this figure doesn't imply that module 10 must be or can be placed or installed before perimeter block 110, 111 is placed in ditch 30).

FIG. 4A shows perimeter blocks 110, 111 installed against PV module 10. In this figure, cable 410 extends from PV module 10 (hence, out from PV module group 20). Connecting cable 410 is swaged at its end in some versions. But in the version in this figure, alignment cable 410 terminates at a thimble with the cable end wrapping around the thimble and swaged or connected with wire-rope clips. Connecting cable 410's termination is shown as cable swage 420. In this depiction, cable swage 420 connects to cable anchor 425, which is a bolt threaded into threaded insert 125. Other forms of cable anchor 425 are useful. FIG. 4A also shows a scarf joint notch 430 on perimeter block end 440.

FIG. 5A shows substantially the same view as FIG. 4A but with an additional depiction of anchors 510 or perimeter block anchors 510 installed vertically through anchor holes 126. Anchors 510 in this depiction are standard rebar rods extending a distance into the ground. This distance is determined by seismic, wind speed, and geologic conditions per site based on structural loading, typically 1 to 4 ft in depth. Other rods, screws, stakes, etc., are equally suitable for use as anchor 510.

Figure 6:
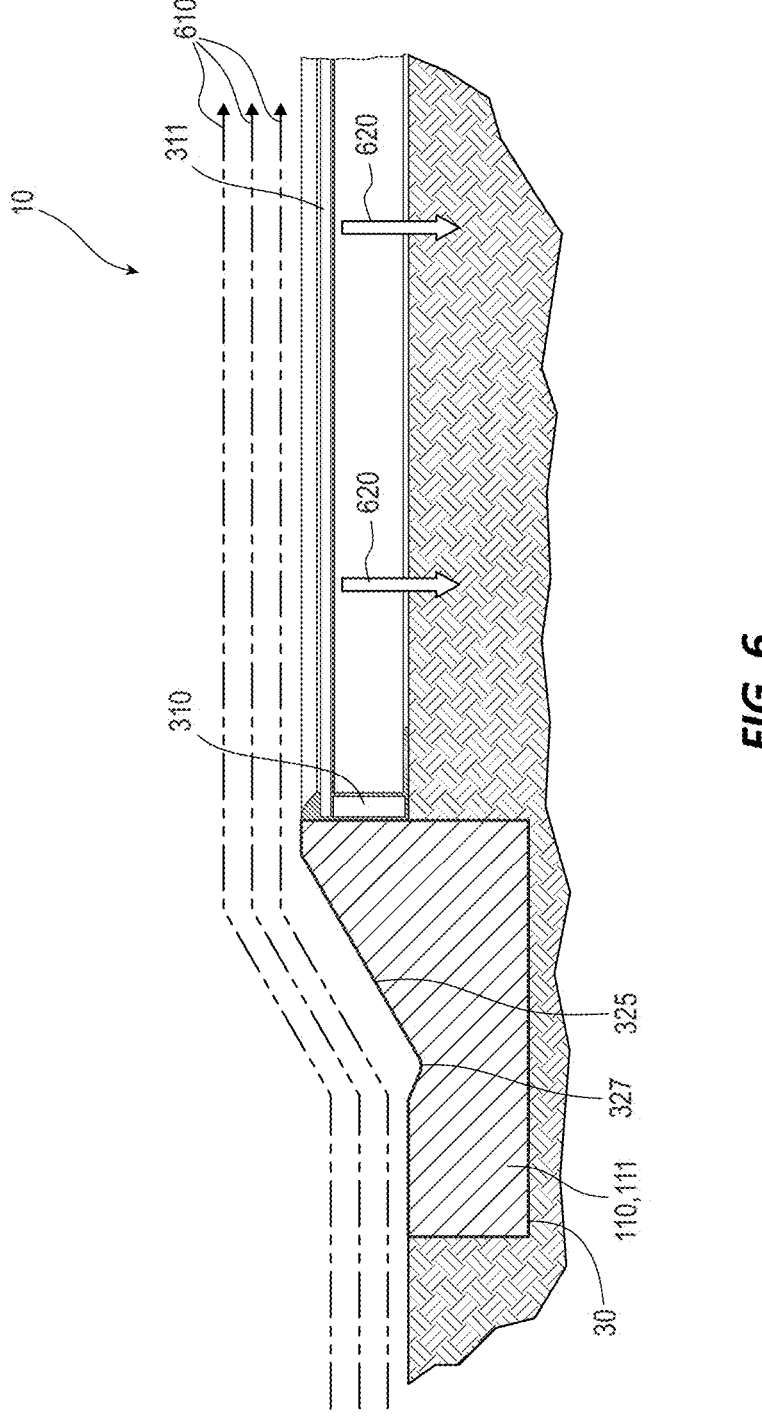
FIG. 6 is another cross-section view of the device of FIG. 1A.

FIG. 6A is another depiction of the end 440 of perimeter blocks 110, 111. Number 610 represents wind (wind vectors and windward side or direction) that flows over PV module group 20. Perimeter blocks 110, 111 redirect incoming wind over PV module group 20, preventing wind from impinging on the edges of PV module 10. In addition, various pressure equalization features between the underside of PV module 10 or PV module group 20 and the upper surface of module 10 or module group 20 prevent the buildup of pressure gradients between the upper and lower sides of module 10 or module group 20. This arrangement of perimeter blocks 110, 111 and pressure equalization features deflects wind or wind gusts over the surface of the PV module groups 20. Wind deflection creates a net downward force on PV module group 20, as indicated by number 620. Thus, wind flow over PV module group 20 holds PV module group 20 down more or better than calm air.

Figure 7A:
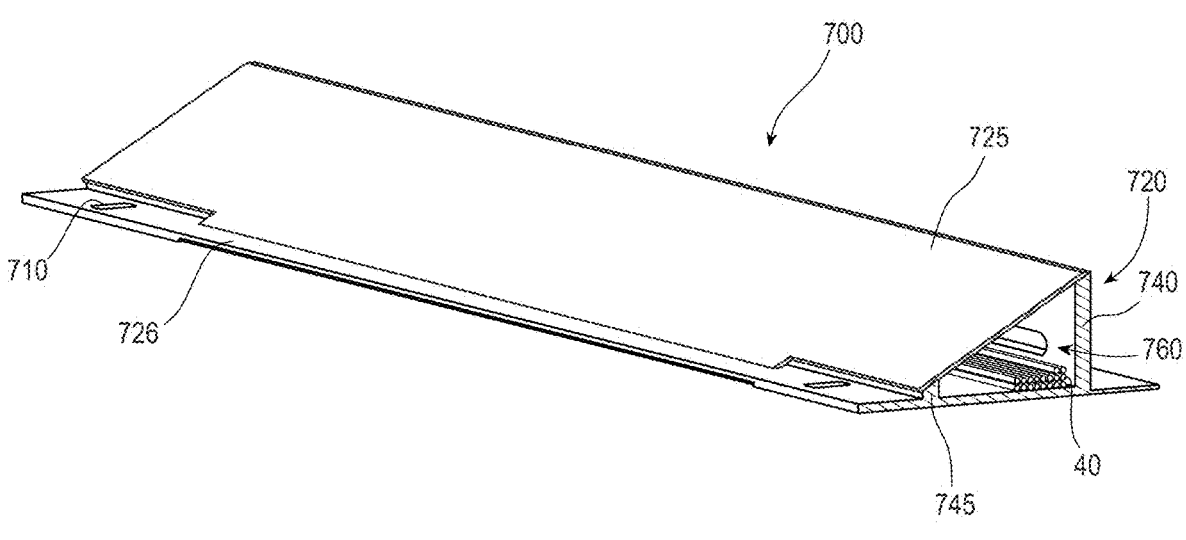
FIG. 7A is a perspective view of another version of the disclosed devices.

FIG. 7A shows another version of a perimeter block. This version is called a capped perimeter block 700 because it has a cap 725 for capped perimeter block base 720. Cap 725 comprises tongue 726 and cap upper surface 727. Base 720 comprises thick flange 730, thin flange 731, front edge 733, tall flange wall 740, tall flange inclined surface 741, short flange wall 745, short flange inclined surface 746, and back edge 750.

Figure 7B:
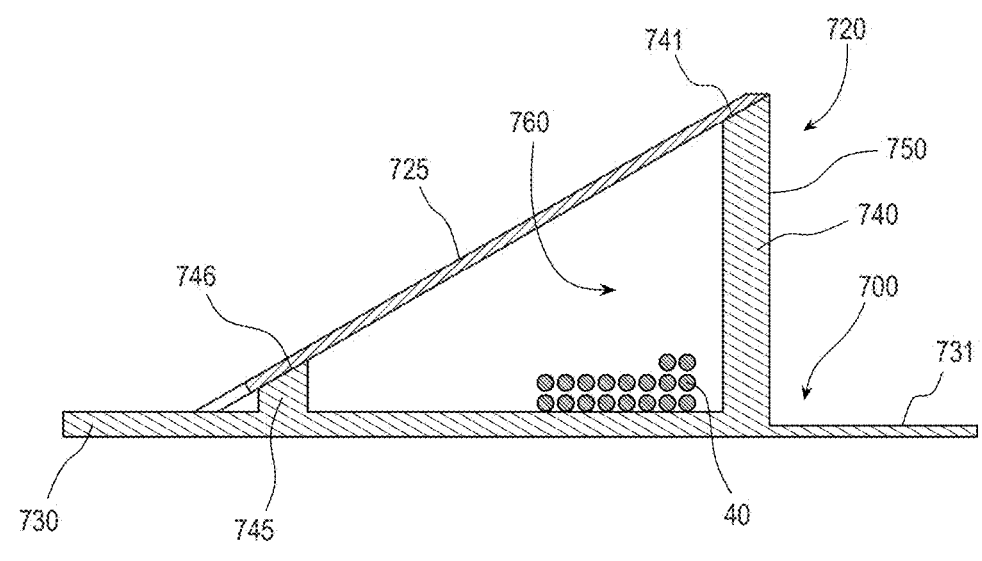
FIG. 7B is a cross-section view of the device of FIG. 7A.

Capped perimeter block base 720 can be described as an extrusion with the FIG. 7B profile shape. (Despite this description, capped perimeter block base 720 can be manufactured using any well-known method). Tall flange wall 740 connects to or is integral with thick flange 730, forming a back edge 750. Short flange wall 745 connects to or is integral with thick flange 730. In some versions, short flange wall 745 connects to thick flange 730 set back from the front edge 733 of thick flange 730. The variance in height between tall flange wall 740 and short flange wall 745 causes cap 725 to connect to base 720 at an incline. Tall flange inclined surface 741 and short flange inclined surface 746 substantially match the incline that tall flange wall 740 and short flange wall 745 cause in cap 725. FIG. 7A shows anchor hole 710.

Figure 8A:
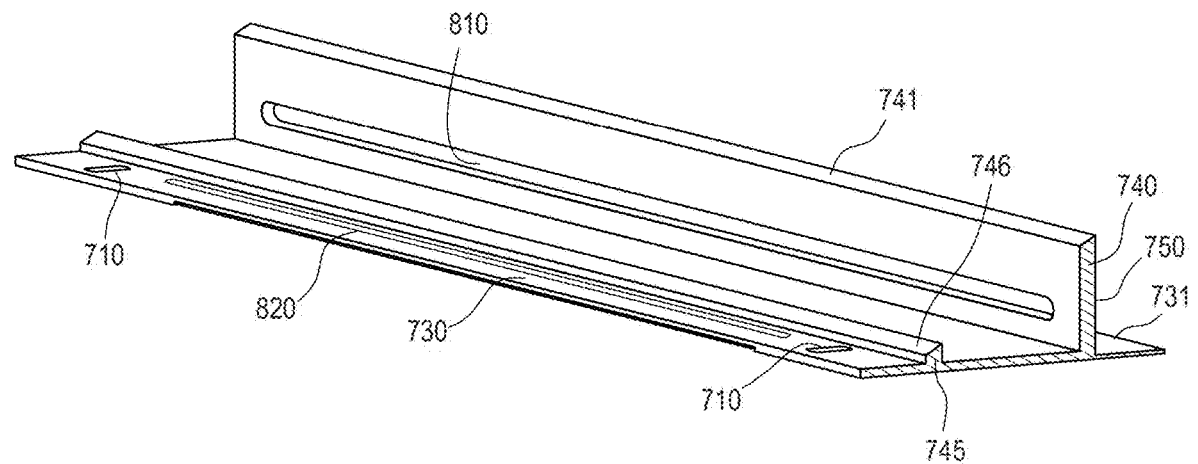
FIG. 8A is a perspective view of a portion of the device of FIG. 7A.
Figure 8B:
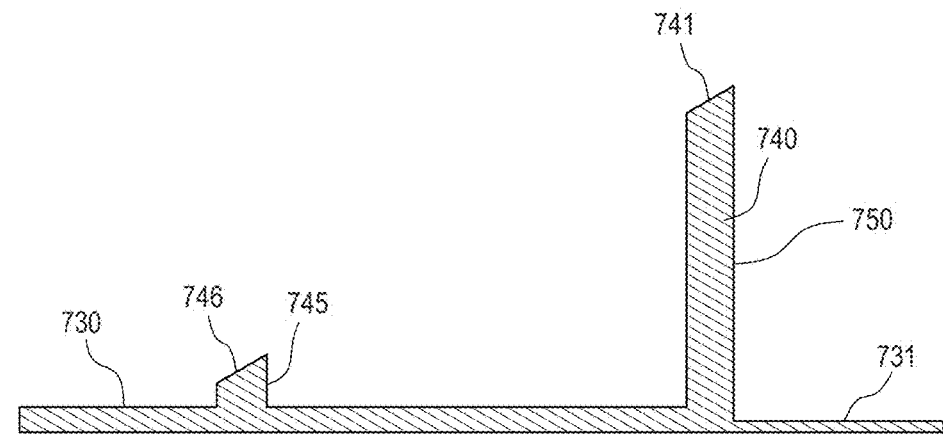
FIG. 8B is a cross-section view of the device of FIG. 8A.

FIG. 8A shows another perspective view of capped perimeter block base 720.

Figure 9A:
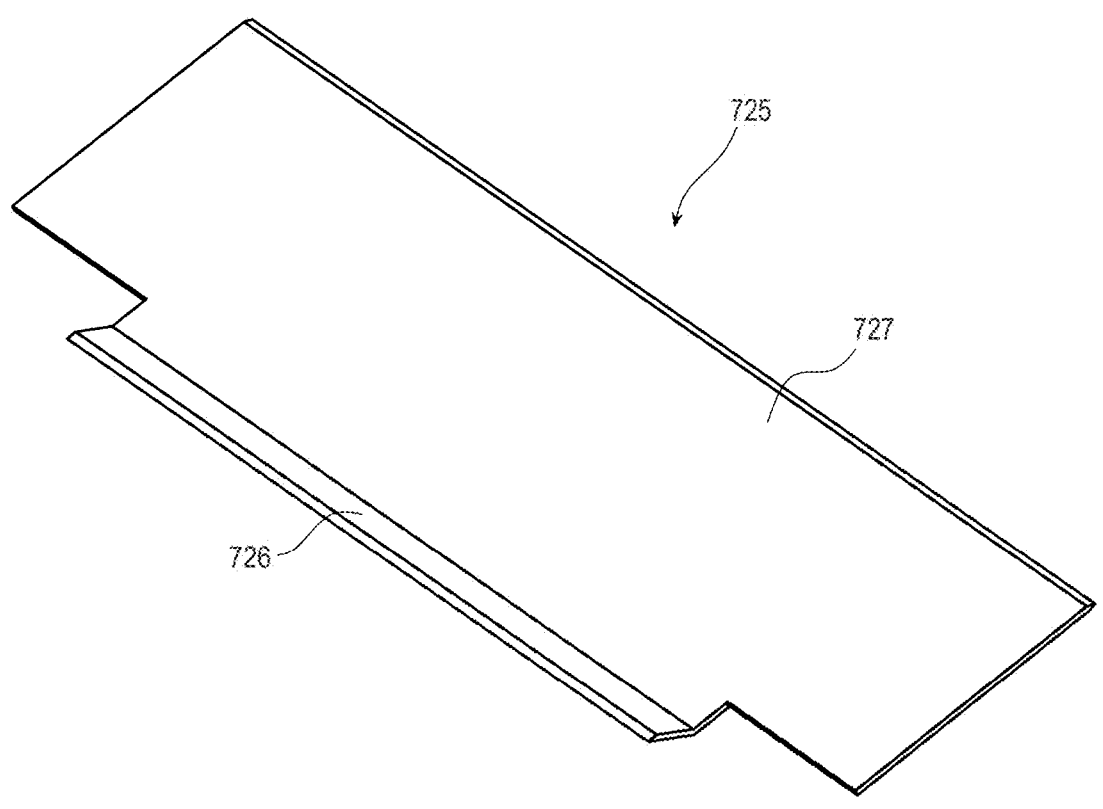
FIG. 9A is a perspective view of a portion of the device of FIG. 7A.
Figure 9B:
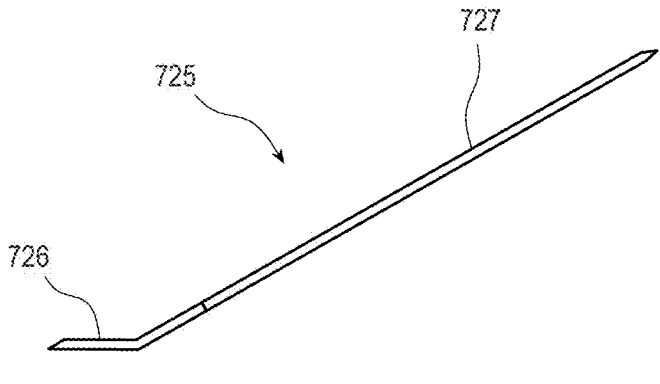
FIG. 9B is a cross-section view of the device of FIG. 9A.

Besides the elements in FIG. 7A and FIG. 7B, FIG. 8A shows anchor hole 710, optional groove 810, and slot 820. Slot 820 is between short flange wall 745 and front edge 733. Tongue 726 (FIG. 9A) fits into slot 820. The optional grove 810 allows internal array cabling to pass into cavity 760.

These components can be produced using any commonly used production method, such as extrusion. Metal- and polymer-based materials are useful for these components. The width of capped perimeter blocks 700 ranges from 3 to 4 ft. The length of capped perimeter blocks 700 ranges from 6 to 7 ft. The height of capped perimeter blocks 700 ranges from 1 to 2 in from grade to top of module frame on grade. Those of ordinary skill in the art will recognize that the capped perimeter blocks' dimensions influence their function, including their aerodynamic function. Various portions of capped perimeter blocks 700 have thicknesses or wall thicknesses ranging from 0.05 to 0.5 in for extruded versions.

When cap 725 connects to base 720, it forms a cavity 760, running the length of capped perimeter block base 720. In some versions, cavity 760 receives electrical cabling from PV module group 20, such as home-run wiring 40 to AC-DC inverters. This arrangement allows simple access to home-run wiring 40.

Figure 10A:
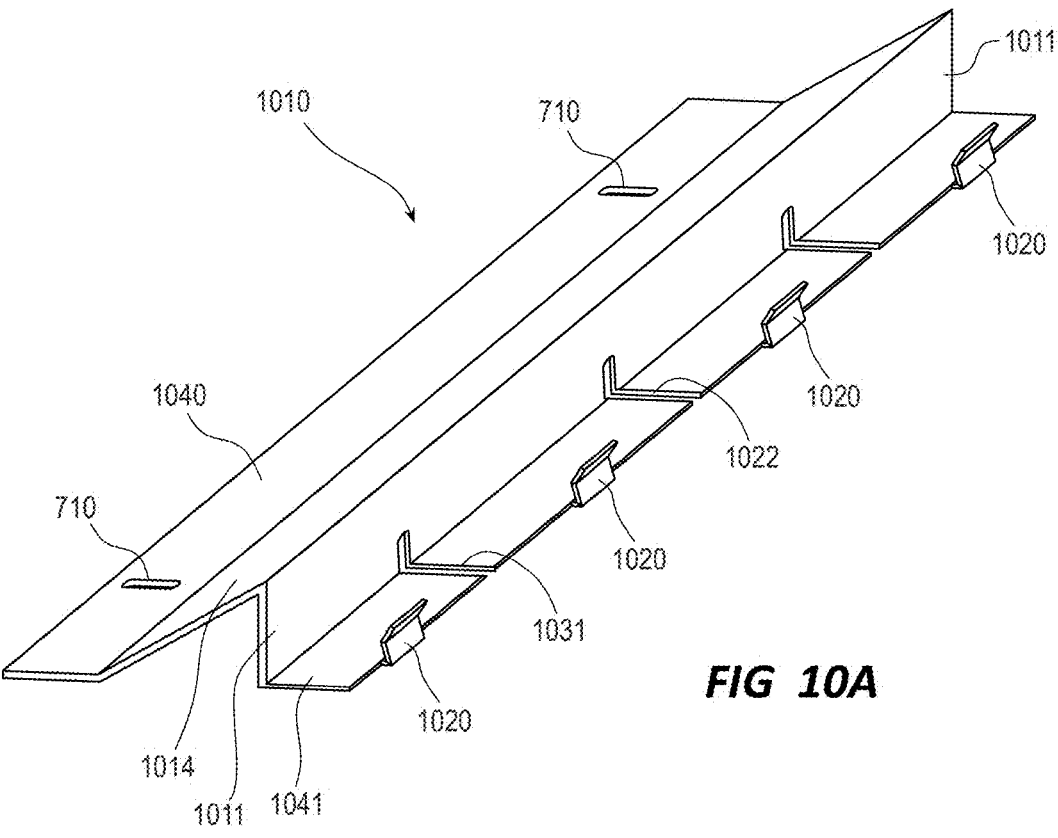
FIG. 10A is a perspective view of another version of the disclosed devices.
Figure 10B:
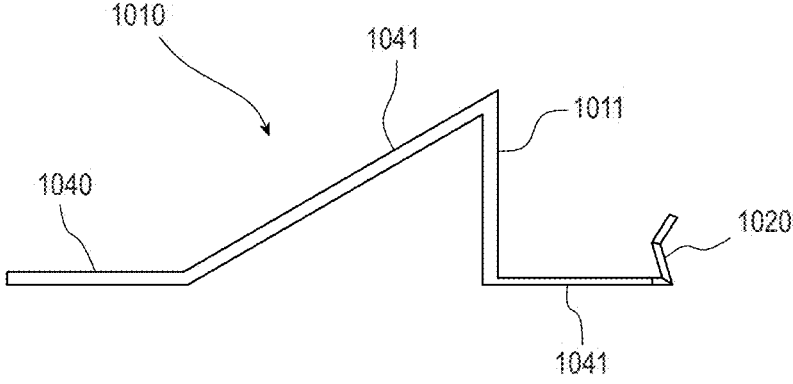
FIG. 10B is a cross-section view of the device of FIG. 10A.

FIG. 10A shows another version of the edging-no standoff (NS) perimeter block 1010. NS perimeter block 1010 comprises NS thick flange 1040 and NS thin flange 1041 connected by NS angled portion 1042 and NS wall 1011. NS thin flange 1041 has 2-8 spring clips 1020 spaced along and extending up from rear edge 1030. FIG. 10B shows a cross-section of NS perimeter block 1010.

FIG. 10A also shows NS module alignment slot 1022, NS bonding slot 1031, and NS anchor holes 1035. As with capped perimeter block base 720, NS perimeter block 1010 has NS cavity 1055 that receives home-run wiring 40 (FIG.

Figure 10C:
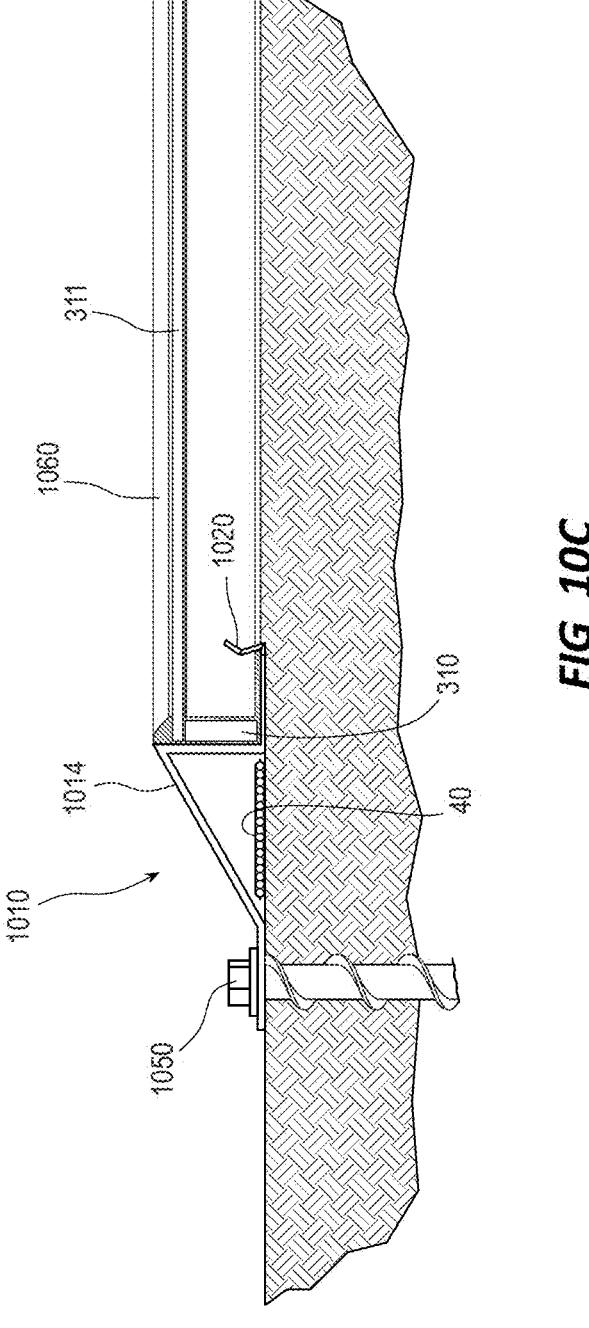
FIG. 10C is another cross-section view of the device of FIG. 10A.

10C). FIG. 10C also shows PV module 10, having glass 1060, module frame 310, and semiconductor layer 311 connected to NS perimeter block 1010 using spring clips 1020. Other versions could use bolts or other connectors extending through the side of the module frame 310 into perimeter blocks 110, 111. The figure also shows screw anchor 1050 installed through NS anchor holes 1035, in NS thick flange 1040, a distance into the ground. This distance is typically 1 to 4 ft below grade.

These components can be produced using any commonly used production method, such as extrusion. Metal- and polymer-based materials are useful for these components. The width of NS perimeter blocks 1010 ranges from 3 to 4 ft. The length of NS perimeter blocks 1010 ranges from 6 to 7 ft. The height of NS perimeter blocks 1010 ranges from 1 to 2 in from grade to the top of the module frame on grade. Those of ordinary skill in the art will recognize that the dimensions of the NS perimeter blocks 1010 influence their function, including their aerodynamic function. Various portions of NS perimeter block 1010 have thicknesses or wall thicknesses ranging from 0.05 to 0.5 in for extruded versions.

Figure 11A:
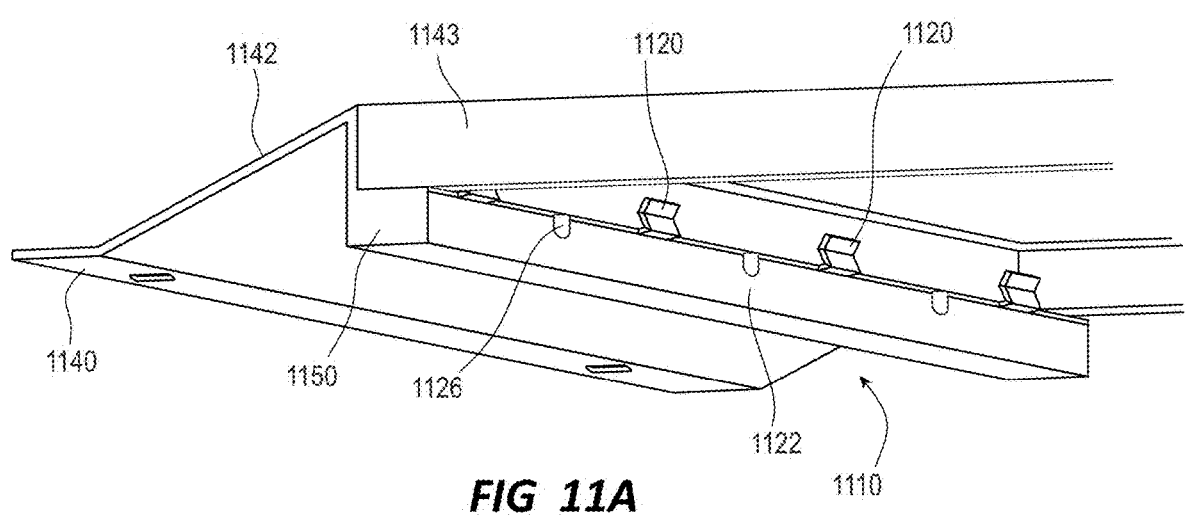
FIG. 11A is a perspective view of another version of the disclosed devices.
Figure 11B:
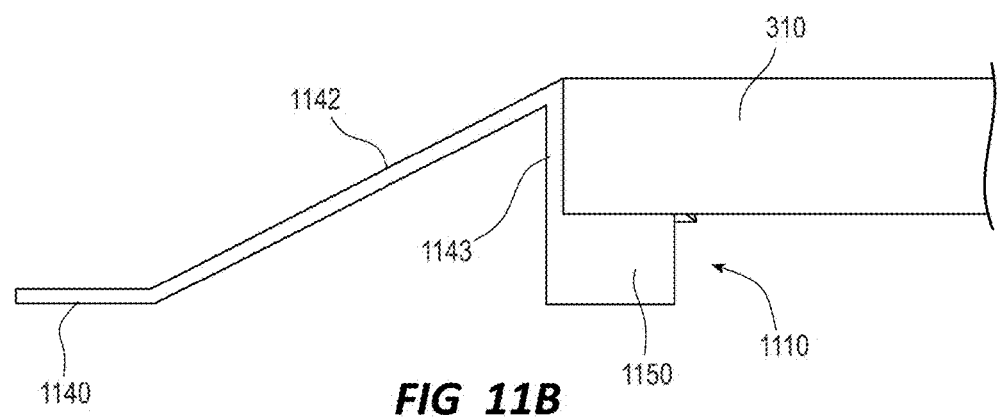
FIG. 11B is a cross-section view of the device of FIG. 11A.
Figure 11C:
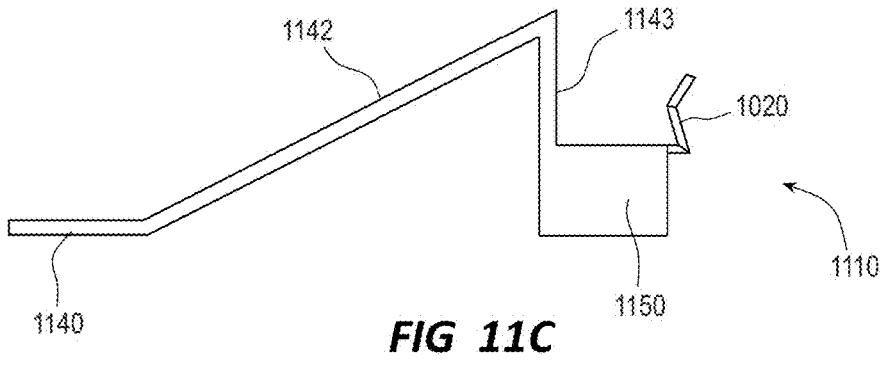
FIG. 11C is another cross-section view of the device of FIG. 11A.

FIG. 11A and FIG. 11B depict standoff (SO) perimeter block 1110. SO perimeter block 1110 is like NS perimeter block 1010 except that it has an additional component, standoff 1150. SO perimeter block 1110 comprises SO thick flange 1140 connected by SO angled portion 1142 to SO wall 1143. Standoff 1150 has 2-8 spring clips 1120 spaced along and extending up from the SO rear edge 1130 at the rear edge of standoff 1150. FIG. 11A also shows SO module alignment slot 1122, SO bonding slot 1131, and SO anchor holes 1135. SO anchor holes 1135 pierce SO thick flange 1140. As with capped perimeter block base 720, SO perimeter block 1110 has SO cavity 1155 that receives home-run wiring 40 (FIG. 11C). FIG. 11C also shows PV module 10, which has glass 1060 and module frame 310 connected to SO perimeter block 1110 using spring clips 1120.

These components can be produced using any commonly used production method, such as extrusion. Metal- and polymer-based materials are useful for these components. The width of SO perimeter blocks 1110 ranges from 3 to 4 ft. The length of SO perimeter blocks 1110 ranges from 6 to 7 ft. The height of SO perimeter blocks 1110 ranges from 1 to 2 in from grade to the top of the module frame on grade. Those of ordinary skill in the art will recognize that the dimensions of the SO perimeter blocks 1110 influence their function, including their aerodynamic function. Various portions of SO perimeter block 1110 have thicknesses or wall thicknesses ranging from thicknesses or wall thicknesses ranging from 0.05 to 0.5 in for extruded versions.

Figure 12:
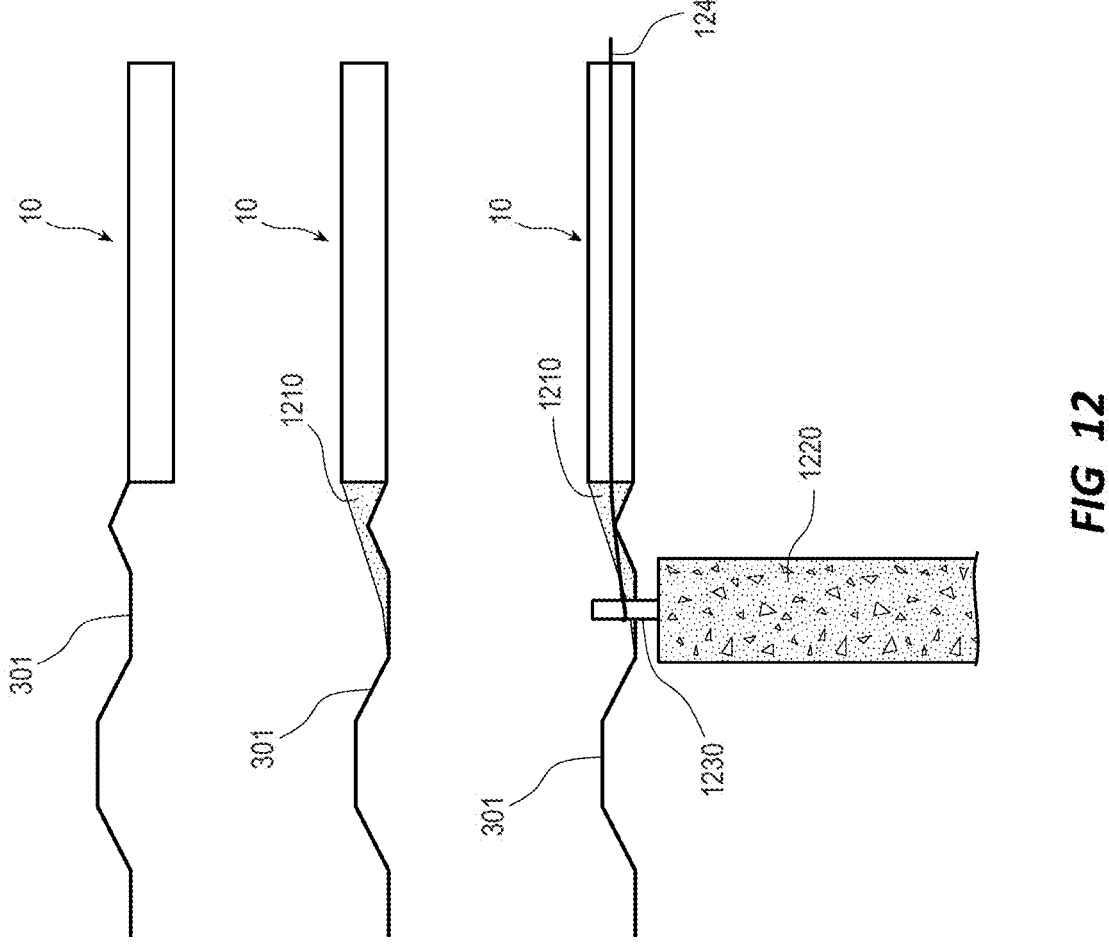
FIG. 12 is a cross-section of alternatives to the disclosed devices.

FIG. 12 depicts alternative methods to achieving perimeter blocks' effects, including placing a module 10 flush with grade 301, piling aggregate base up to the top of the module frame, and supplying a pier and post foundation without an aggregate base.

Figure 13:
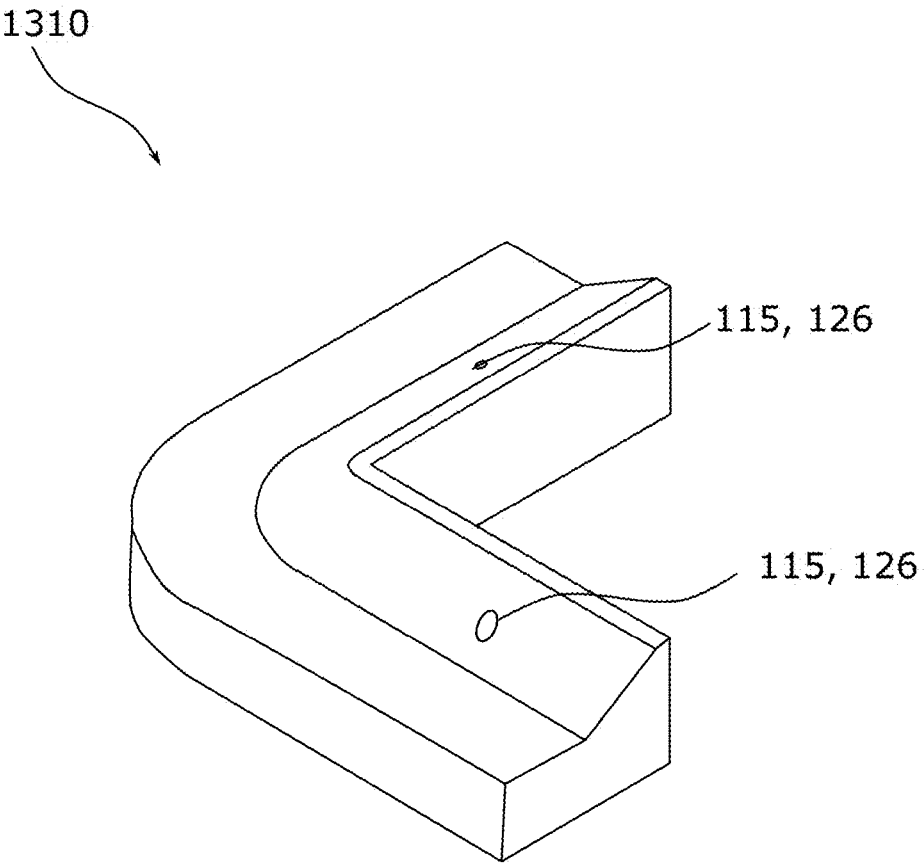
FIG. 13 is a perspective view of a corner perimeter block.

FIG. 13 depicts a curved corner perimeter block 1310 with module alignment holes or anchor holes 115, 126. Corner block 1310 serves as a corner boundary for module 10 in various Earth Mount Solar installations.

Figure 14:
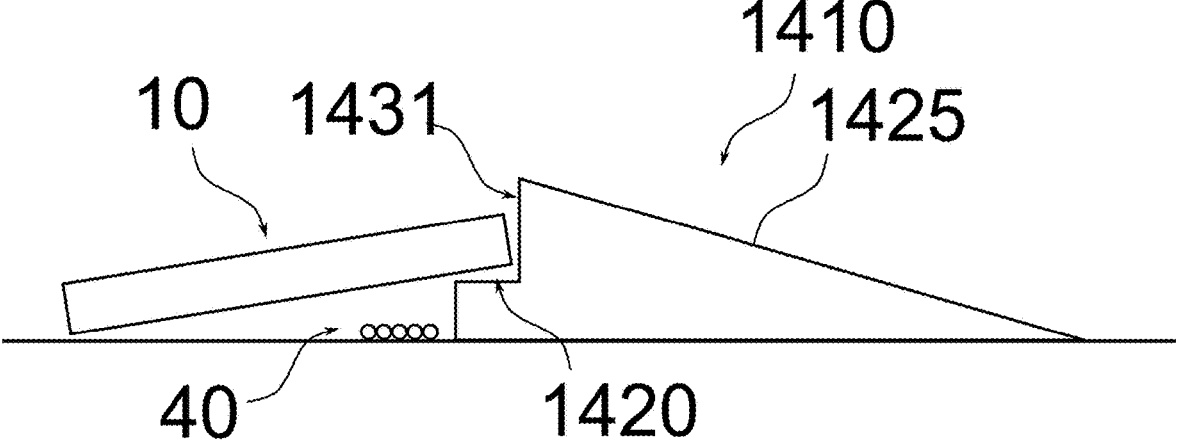
FIG. 14 is a schematic view of a ledged perimeter block.

FIG. 14 depicts a ledged perimeter block 1410. As with other perimeter blocks, block 1410 has an angled portion 1425. Additionally, block 1410 has ledge 1420. The figure shows that ledge 1420 forms a ledge or shelf for solar module 10. The figure shows cable assembly 40 secured in the region underneath module 10.

This figure dramatically exaggerates the tilt of module 10 and the relative thickness of module 10 versus vertical depth 1431. Depending upon the embodiment, vertical depth 1431 has a larger, smaller, or the same depth as the thickness of module 10.

FIG. 14 also shows block 1410 sitting on grade 301. This depiction is representative of some embodiments, but other embodiments exist in which block 1410 sits below grade 301.

Figure 15:
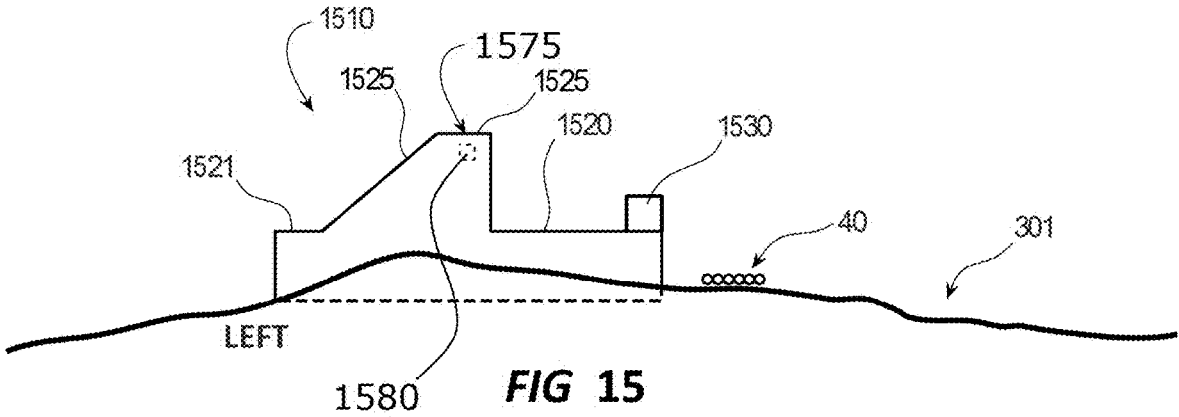
FIG. 15 is a side view of another version of a ledged perimeter block.

FIG. 15 depicts a side view of another version of a ledged perimeter block 1510. Block 1510 has ledge 1520, horizontal portion 1521, angled portion 1525, lip 1530, alignment flag 1575, and alignment device 1580.

Figure 16:
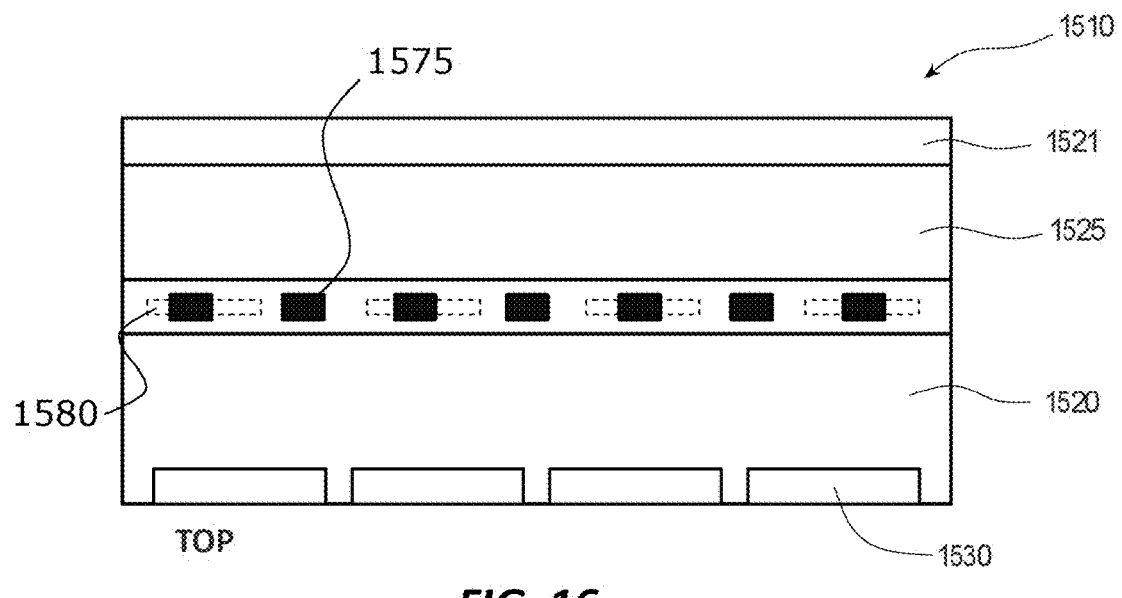
FIG. 16 is a plan view of the block of FIG. 15.

FIG. 16 shows a plan view of FIG. 15. Block 1510 uses lip 1532 to block the frame of module 10 from moving off of ledge 1520.

Optional alignment flag 1575 is a reference for the sensors or vision system of a robotic cleaner or sweeper to allow the robot to position itself on module 10 correctly. Alignment flag 1575 can be embedded in the surface, printed, or applied on upper horizontal surface 1522, or in some embodiments on any other surface of block 1510. In some versions, alignment flag 1575 is a passive or active device.

Optional alignment device 1580 signals or responds to a signal from a robotic sweeper, allowing the sweeper to position itself on module 10. Alignment device 1580 can be any shape and can be located on or in the perimeter block depending on the technology employed for communication between alignment device 1580 and the robotic cleaner. This is so despite the exemplary locations indicated in FIGS. 15 and 16.

Figures 17, 18:
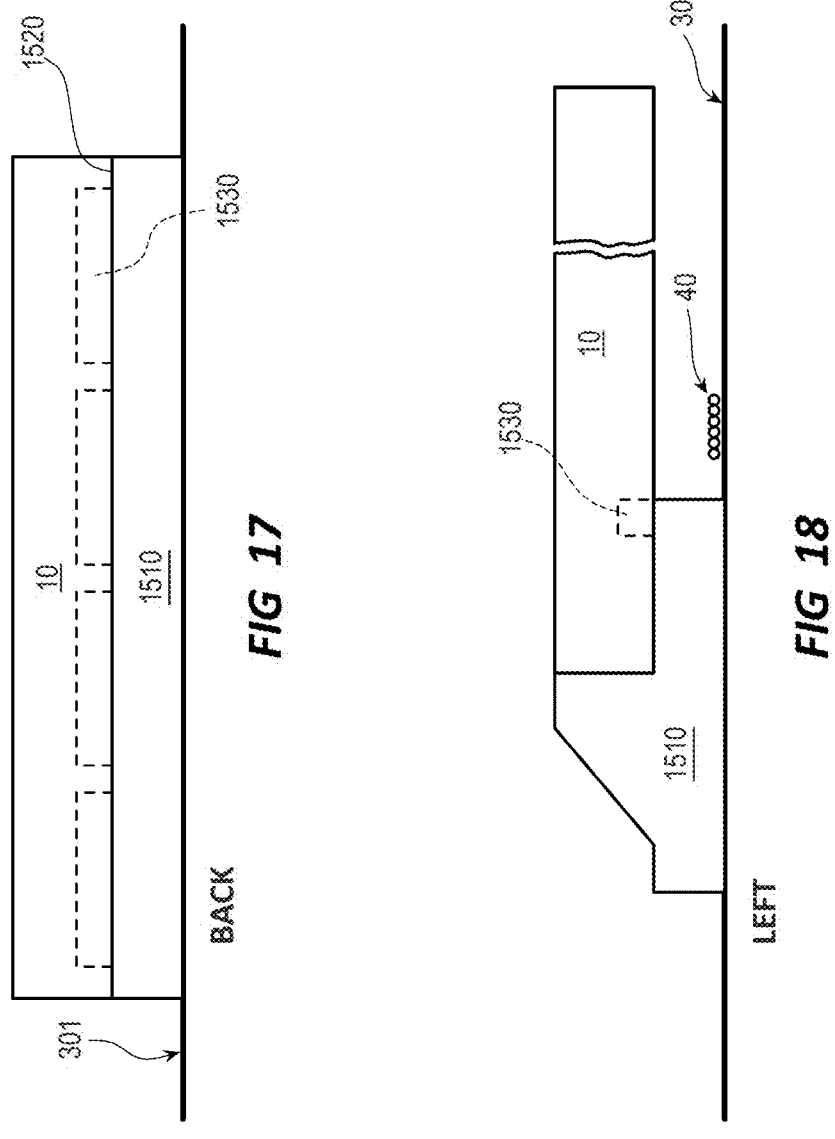
FIG. 17 is a back view of the block of FIG. 15.
FIG. 18 is a side view of the block of FIG. 15.

FIG. 17 as a back view of leading perimeter block 1510. This figure shows the longitudinal extent of lip 1530.

FIG. 18 is a side view of perimeter block 1510, including module 10 placement.

Figure 19:
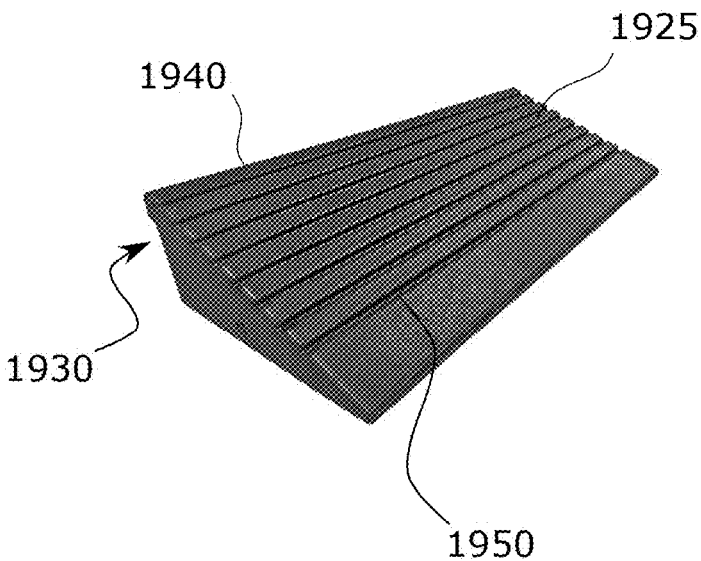
FIG. 19 is a perspective view of another version of a perimeter block.

FIG. 19 is a perspective view of a perimeter block 1910. Perimeter block 1910 has angled portion 1925, top edge 1940, relief 1930, and grooves 1950. Perimeter block 1910 functions mainly as the perimeter blocks discussed previously.

Figure 20:
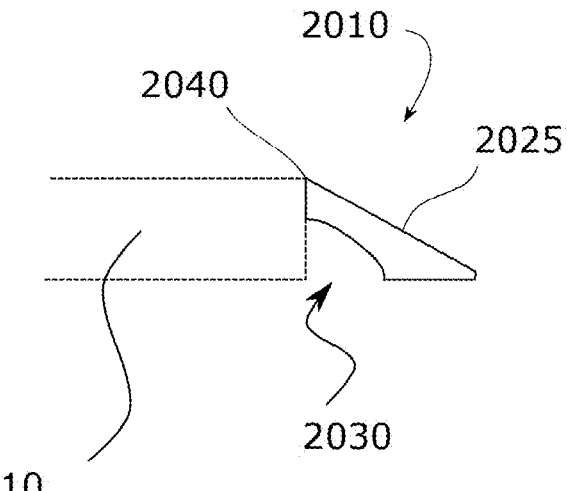
FIG. 20 is a schematic cross-section of the block of FIG. 19.

FIG. 20 shows a side view of perimeter block 2010 as it abuts against module 10. The figure shows relief 2030.

Figure 21:
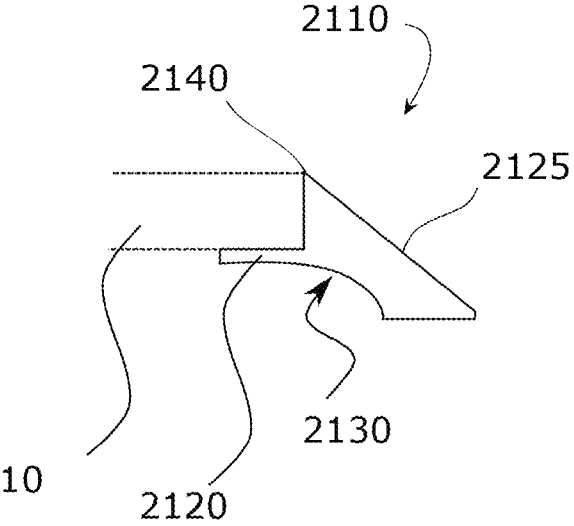
FIG. 21 is a schematic cross-section of another version of a perimeter block.
Figure 22:
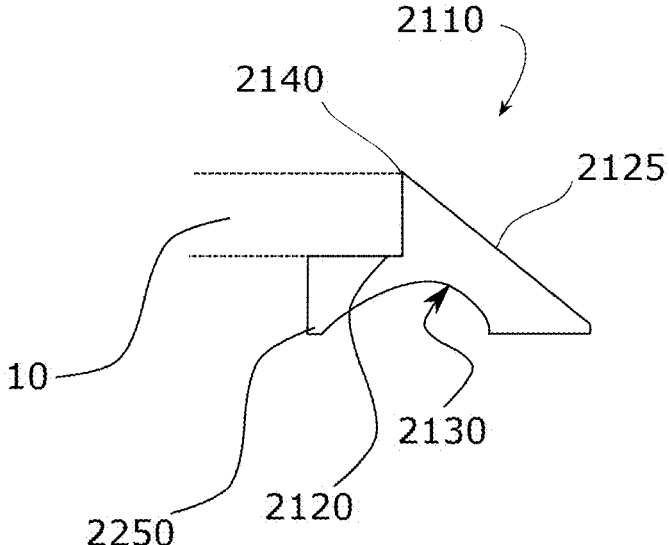
FIG. 22 is a schematic cross-section of another version of a perimeter block

FIG. 21 shows an alternative version of perimeter block 1910-perimeter block 2110. Perimeter block 2110 has ledge 2120 for receiving module 10 and the components discussed for perimeter block 1910. FIG. 22 shows an alternative version of perimeter block 1910 or perimeter block 2210. In addition to the components discussed above, it includes leg 2250, which supports this version of perimeter block 2110.

Figure 23:
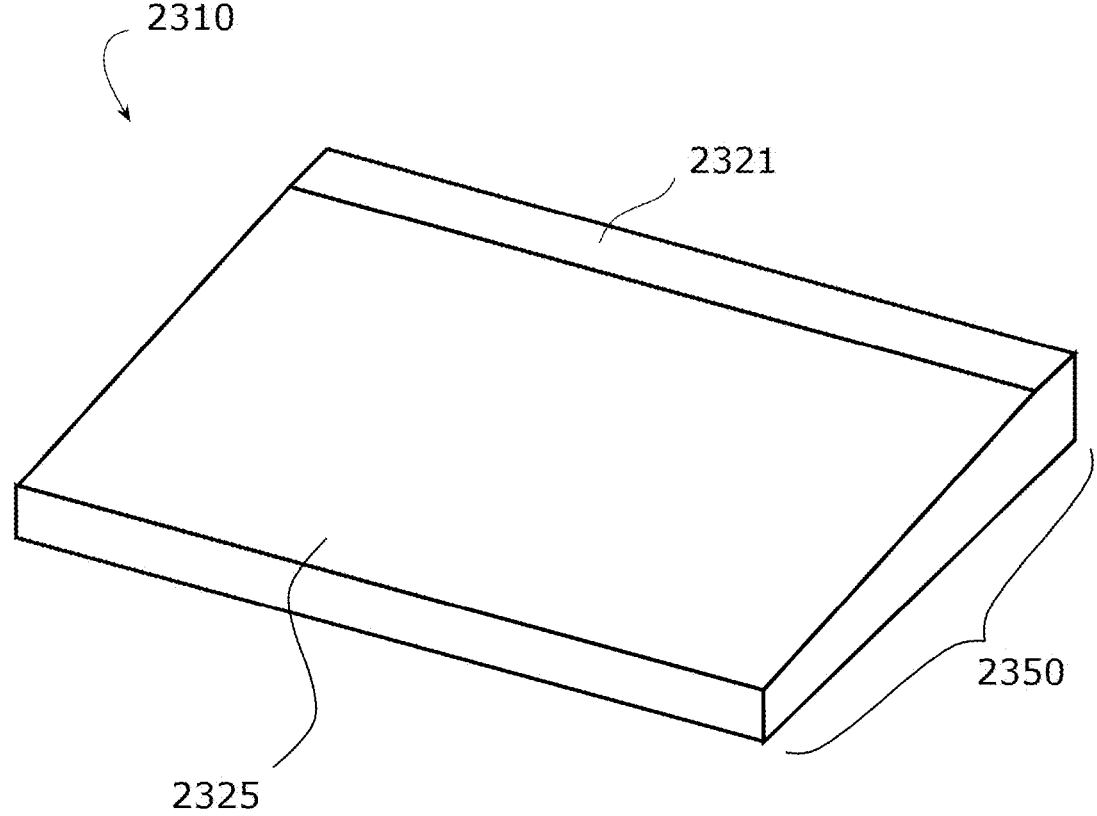
FIG. 23 is a perspective view of another version of a perimeter block.
Figure 24:
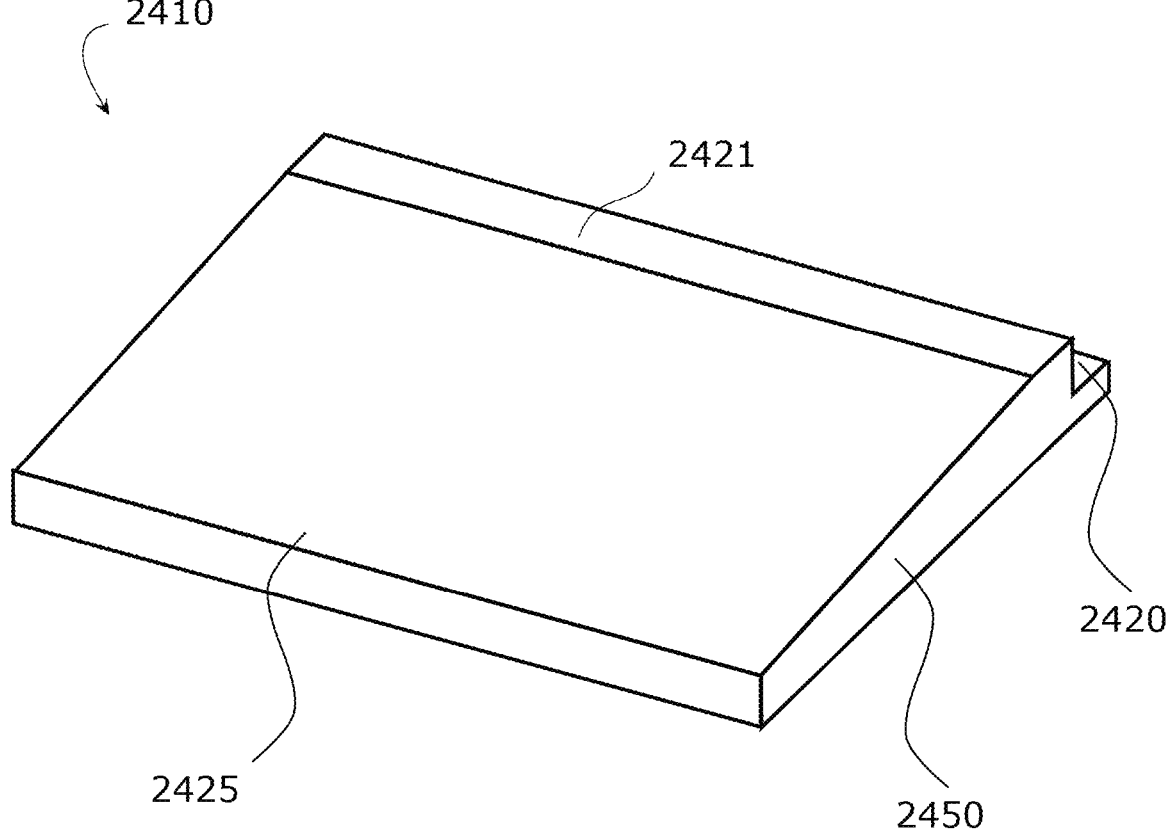
FIG. 24 is a perspective view of another version of a perimeter block.

FIG. 23 and FIG. 24 show perimeter blocks 2310 and 2410. These blocks are similar to the perimeter blocks discussed above. However, perimeter block 2310 has a top edge 2340 and an angled portion 2325. Similarly, perimeter block 2410 has top edge 2440, angled portion 2425, and ledge 2420, which can receive module 10. The difference between the blocks shown in FIGS. 23 and 24, and some of those described above are that the distance 2350 can range from 6 inches to 3 feet.

In some versions, the perimeter blocks are hollow and are filled with ballasts such as gravel or sand after placement at the site. In some versions, the specific shape is a design feature that can be optimized, such as the mass, length, or other parameter. Any material suitable for use in these blocks is included in the disclosure.

While particular exemplars of the present invention have been shown and described, it will be obvious to those skilled in the art that changes and modifications can be made without departing from the exemplars of this invention in its broader aspects and, therefore, the appended claims are to encompass within their scope all such changes and modifications as fall within the true, intended, explained, disclose, and understood scope, and spirit of this invention's many exemplars and alternative descriptions.

Some exemplars recite ranges. When this is done, it discloses the ranges as a range and disclose each point within the range, including endpoints. For those exemplars that disclose a specific value or condition for an aspect, supplementary exemplars exist that are otherwise identical but specifically exclude the value or the conditions for the aspect.

The following description of several exemplars describes non-limiting examples that further illustrate the invention. No titles of sections contained herein, including those appearing above, are limitations on the invention, but instead, they are provided to structure the illustrative description of the invention provided by the specification.

Any methods and materials similar or equivalent to those described in this document can be used in the practice or testing of the present invention. This disclosure incorporates by reference all publications mentioned in this disclosure and the information disclosed in the publications.

This disclosure discusses publications only to facilitate describing the invention. Their inclusion in this document is not an admission they are effective prior art to this invention, nor does it indicate that their publication dates or effectiveness are as printed on the document.

Definitions (for Purposes of this Disclosure)

A "module" is the photovoltaic media, PV wire connections to the media, and any support, such as frames, the manufacturer adds to the media. Modules range from 100-850 watts to 1-4 m³.

"Array" is a grouping of multiple modules, some of which are next to three separate modules. In some implementations, an array has greater than 5, 10, 15, 20, 30, 40, 50, 60, 70, 80, 90, or 100 columns of modules. In some implementations, an array has greater than 5, 10, 15, 20, 30, 40, 50, 60, 70, 80, 90, or 100 rows of modules. In some implementations, an array has more than 50, 100, 200, 400, 600, or 800 modules. Sometimes, rows or columns have two or more modules. Module-to-module spacing for site-oriented systems can be much, much closer. In some implementations, module-to-module spacing in a T-mounted system ranges from 0.1 300 mm, 10-200 mm, 1-50 mm, or 1-25 mm.

"Contiguous" or "adjacent" modules, rows, or columns means modules, rows, or columns having a spacing of less than 30, 20, 10, or 5 cm "Conterminous" means that each member of a group or grouping is next to at least one other member.

"No favored orientation" means that the array is oriented with respect to a geographic feature on the site, e.g., river, stream bed, canyon, hill, etc. In some embodiments, the array is not oriented with respect to the sun's direction. "Geographic feature" includes legal property lines but does not include latitude, longitude, or the orientation of impinging sunlight. Systems with no favored orientation are sometimes called Earth or topography-oriented. Azimuth independent means independent of the sun's orientation with respect to the module's latitude.

In some implementations, "earth-mounted" refers to a group of greater than 50, 100, 200, 400, 600, 800, 1000, or 1500 modules in which at least 80 percent of the modules have at least one contact point, as defined below, that rests on the ground or rests on a contact surface of one or more structures, provided that the portion or portions of the structure or structures encompassed by the volume of space beneath and perpendicular to the contact surface is solid or constrains air movement.

In some versions, "contact points" are regions of a module that touch the ground or touch a contact surface. In some versions, "contact points" are regions of a module that touch the ground without intervening regular structure or are regions of a module that touch the ground without intervening manufactured structure.

"Contact surfaces" are structure portions that touch a contact point. In some implementations, the volume perpendicular to the contact surface between the contact surface and the ground does not have free air. In some implementations, an object that does not have "free air" is an object that does not contain constrained air. Finally, in some versions, a contact surface defines a starting point of a continuous path that ends at a point of the structure touching the ground and directly beneath the contact surface.

In some implementations, the volume perpendicular to the contact surface between the contact surface and the ground constrains air movement. In some versions, "constrains air movement" means "constrains lateral air movement". In some implementations, an object that "constrains air movement" bounds a volume of air on at least two lateral sides. In some implementations, "constrained air" is air constrained on at least two lateral sides in addition to the top and bottom.

For purposes of this disclosure and depending upon the implementation, "utility-scale" means having one or more of the following characteristics: a total DC output of greater than 200, 300, 400, 500, 600, 700, 800, 900, 1000, 1100, 1200, 1300, 1400, 1500, 1600, 1700, or 1800 V; or a total DC power output of greater than 100, 200, 500, 700, 1000, 2000 kW.

In some implementations, "earth-mounted" means any flat mounting substantially parallel to the Earth or ground that places the plane of the array within a short distance above the ground. This disclosure sometimes uses "ground-mounted" as a synonym for "earth-mounted". In some versions, "flat" means horizontally flat and substantially parallel to the Earth. In some implementations, a "ground module" is an earth-mounted module.

In some implementations, "ground level" is the level of the ground immediately before module installation.

"Ground" or "native topography" is the surface of the site and includes material naturally present at the site and material added to the site by human activity at any time before the first module is placed. In some implementations, "Ground" or "native topography" is the surface of the site and includes material naturally present at the site and irregularly shaped material added to the site by human activity at any time before placing the first module. In some implementations, "Ground" or "native topography" is the surface of the site and includes material naturally present at the site and material added to the site by human activity at any time before placing the first module, provided that the largest dimension of 80% of the material is less than 20 cm.

"Structure" is any material added to the site or brought onto the site that occupies any of the space between a module and the ground and does not include manufacturer support. "Structure" is support for the module not installed by the panel manufacturer during production.

Perpendicular and parallel are defined with respect to the ground's local tangent plane.

"Plane of the array" is the average of the planes for each individual module in the array.

"Robotic cleaning device" is an air-pressure-based, water-pressure-based, vacuum-based, brush-based, or wiper-based device for cleaning modules.

"Autonomous" means performed without manual intervention or undertaken or carried out without any outside control. For example, an "autonomous robotic device" is a robotic cleaning device that operates to clean modules without real-time human control. An "autonomous robotic device" is sometimes used synonymously for a "fully autonomous cleaning robot". An AI autonomous robotic device is an autonomous robotic device that contains hardware and software that observes its own cleaning performance and adjusts its performance algorithms based on those observations.

In some implementations, "operates to clean modules" includes initiating a cleaning cycle.

A "cleaning cycle" is a complete cleaning of a section of modules from start to finish. In some implementations, a cleaning cycle includes the robotic device leaving its resting pad or structure, traveling to a section of modules, cleaning each module of the section, and traveling to another section of modules or returning to the resting pad or structure.

"Cleaning period" is 6, 12, 24, 36, 48, 60, 72, 84, 96, 108, 120, 132, or 144 hours.

"Module-to-module z-axis variability" or "module-to-module elevation difference"—is a measure of the largest elevation difference between the highest point at a module edge and the lowest point of an adjacent edge of an adjacent module. The "z-axis" extends from the module face and points substantially vertically.

In some implementations, when used to describe an array, "smooth", "smoothed", "flat", or "flattened" means smooth or flat enough or made smooth or flat enough such that the height difference or the module-to-module z-axis variability between adjacent modules is small enough that a fully autonomous cleaning robot can move from one module onto another. For example, the maximum module-to-module z-axis variability in some implementations is less than 4, 3, 2, 1, or 0.5 inches. Likewise, in some implementations, when used to describe the ground, "smooth", "smoothed", "flat", or "flattened" means smooth or flat enough or made smooth or flat enough such that the height difference or the module-to-module z-axis variability between adjacent modules in an array installed on the ground is small enough that a fully autonomous cleaning robot can move from one module onto another.

"Low module elevation" is defined as an elevation of a module that is low enough to prevent upward forces caused by air movement across the module from lifting a module from the array, whether the array comprises mechanical components to resist module lifting or not. In some implementations, a low module elevation is defined as an elevation of a group of modules that is low enough that air-caused upward forces on the group are too small to lift the group. For example, in some implementations, low module elevation is an elevation of less than 100 cm, 0 to 90 cm, 0 to 80 cm, 0 to 70 cm, 0 to 60 cm, 0 to 50 cm, 0 to 40 cm, 0 to 30 cm, 0 to 20 centimeters, or 0 to 10 cm measured from the ground to a lower edge of the module or, in edge-less module systems, from the ground to the module surface.

"Intermediate distance" is from 0-1 m, 0-70 cm, 0-60 cm, or 0-50 cm. "Short distance" is defined as 0-49.9 cm, 0-30 cm, 0-20 cm, or 0-10 cm.

"Mechanical stow functionality" changes the direction that a tracker-based system points to the modules to minimize the effect of winds on the system. This minimizes the danger of high winds damaging the tracker or the installed modules.

"Extreme dampening functionality" dampens mechanical oscillations in a tracker-based system caused by high winds to minimize the danger that those winds will damage the tracker or the installed modules.

"Connectors" are structures that connect modules. In various implementations, connectors can be mechanical connectors, electrical connectors, electrical interconnects, or both. "Electrical interconnects" are DC electrical connections between modules.

"Flexible connections" or "flexibly connected" describe connections made with rigid or non-rigid connectors that allow the angle between a module's plane and an adjacent module to vary without breaking the connection.

"Joints" are any permanent or semi-permanent connection between the joined components.

A "high DC:AC" voltage ratio exceeds 1.0-2, 1.1-1.9, 1.2-1.8, and 1.3-1.7.

This document incorporates the contents of U.S. patent application Ser. No. 18/671,146, filed on May 22, 2024 by this reference.

What is claimed is:

1. A utility-scale PV array comprising:
   a group of PV modules on or contacting the ground in an array;
   a plurality of perimeter blocks that have
     a bottom that contacts the ground,
     an upper side,
     a horizontal portion,
     an angled portion,
     a module alignment hole,
     wherein at least one of the plurality of perimeter blocks impedes water flow under the perimeter block and directs wind and water across the array;
   and
   a connecting cable disposed in the module alignment hole and passing through or along a PV module of the group of PV modules.

2. The array of claim 1, further comprising a plurality of connecting cables wherein at least one connecting cable passes through or along a plurality of the PV modules.

3. The array of claim 2, wherein the perimeter block is a freestanding body.

4. The array of claim 3, wherein the array is smoothed.

5. The array of claim 4 further comprising a corner perimeter block.

6. The array of claim 5, wherein the perimeter block impedes water flow between itself and an adjacent perimeter block.

7. The array of claim 1, wherein one or more connecting cables pass through clips disposed between PV modules.

8. A utility-scale PV array comprising:
   a plurality of PV modules on or contacting the ground in an array,
   perimeter blocks adjacent the PV modules that contact the ground, wherein at least one perimeter block has an upper side, a horizontal portion, and an angled portion and directs wind and water across the array,
   the perimeter blocks comprise 1-30 corner perimeter blocks,
   and
   a connecting cable that passes through a module alignment hole in the perimeter blocks and that passes through at least some of the plurality of PV modules.

9. The array of claim 8, wherein at least one of the perimeter blocks impedes water flow under the perimeter block.

10. The array of claim 9, wherein one or more connecting cables pass through the plurality of PV modules.

11. The array of claim 10, wherein the perimeter blocks further comprise a bonding hole.

12. The array of claim 9, wherein one or more connecting cables pass through clips disposed between PV modules.

13. The array of claim 8, wherein the array is smoothed.

14. A utility-scale PV assembly comprising:

PV modules on or contacting the ground in an array;

a structure adjacent the array that comprises a plurality of boundary blocks that direct wind and water across the array;

and a connecting cable that passes through a module alignment hole in the boundary blocks and that passes through some of the PV modules in the assembly of PV modules.

15. The assembly of claim 14, wherein at least one of the boundary blocks impedes water flow under the boundary block.

16. The assembly of claim 15, wherein the boundary blocks comprise an upper side, a horizontal portion, and an angled portion.

17. The assembly of claim 16, wherein the structure further comprises corner boundary blocks.

18. The assembly of claim 17, wherein a plurality of the boundary blocks further comprises a bonding hole.

19. The assembly of claim 18, wherein the array is smoothed.

20. The assembly of claim 14, wherein the structure further comprises corner boundary blocks the boundary blocks comprise an upper side, a horizontal portion, an angled portion, and a bonding hole at least one of the boundary blocks impedes water flow under the boundary block and the array is smoothed.

* * * * *